United States Patent
Hoshi et al.

(10) Patent No.: US 6,797,517 B1
(45) Date of Patent: Sep. 28, 2004

(54) CATALYST DEGRADATION DETECTING DEVICE AND METHOD THEREOF IN INTERNAL COMBUSTION ENGINE

(75) Inventors: Koichi Hoshi, Susono (JP); Kazuhiro Sakurai, Gotenba (JP); Takashi Watanabe, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/561,003

(22) Filed: Apr. 28, 2000

(30) Foreign Application Priority Data

Apr. 28, 1999 (JP) .......................................... 11-122005

(51) Int. Cl.$^7$ .............................................. G01N 31/10
(52) U.S. Cl. ........................... 436/37; 422/83; 422/105; 60/277; 60/276
(58) Field of Search .............................. 436/37; 60/277, 60/276; 422/83, 105

(56) References Cited

U.S. PATENT DOCUMENTS

| | | | | |
|---|---|---|---|---|
| 5,379,586 A | * | 1/1995 | Honji et al. | 60/276 |
| 5,381,657 A | * | 1/1995 | Takizawa et al. | 60/276 |
| 5,591,905 A | * | 1/1997 | Fujimoto et al. | 73/118.1 |
| 5,626,014 A | * | 5/1997 | Hepburn et al. | 60/274 |
| 5,732,552 A | * | 3/1998 | Matsumoto et al. | 60/276 |
| 5,737,916 A | * | 4/1998 | Mitsutani | 60/276 |
| 5,743,082 A | * | 4/1998 | Matsumoto et al. | 60/274 |
| 5,854,079 A | * | 12/1998 | Kato | 436/152 |
| 5,857,163 A | * | 1/1999 | Trombley et al. | 701/101 |
| 5,921,078 A | * | 7/1999 | Takaku et al. | 60/277 |
| 5,987,977 A | * | 11/1999 | Hanafusa et al. | 73/118.1 |
| 6,047,544 A | * | 4/2000 | Yamamoto et al. | 60/285 |
| 6,082,101 A | * | 7/2000 | Manaka et al. | 60/285 |
| 6,092,368 A | * | 7/2000 | Ishii et al. | 60/277 |
| 6,158,212 A | * | 12/2000 | Tanaka | 60/277 |
| 2001/0032456 A1 | * | 10/2001 | Yonekura et al. | 60/277 |

FOREIGN PATENT DOCUMENTS

| | | | |
|---|---|---|---|
| JP | 598948 A | | 4/1993 |
| JP | 07-180535 | | 7/1995 |
| JP | 979028 A | | 3/1997 |
| JP | 09-088560 | | 3/1997 |
| JP | 09-236569 | | 9/1997 |
| JP | 1061426 A | | 3/1998 |
| JP | 2000064830 A | * | 2/2000 |
| JP | 2000104538 A | * | 4/2000 |

OTHER PUBLICATIONS http://pressroom.toyota.com/mediakit/autoshow/2000rel/toyota–detroit/priusla–r.html (Jan. 10, 2000).*

* cited by examiner

Primary Examiner—Mark L. Bell
Assistant Examiner—Jennine Brown
(74) Attorney, Agent, or Firm—Kenyon & Kenyon

(57) ABSTRACT

It is an object of the present invention to contribute to prevention of worsening an exhaust gas emission at the time of cold starting up of an internal combustion engine by providing a technology for accurately determining the degradation of an exhaust gas purifying catalyst provided in an exhaust passage of the internal combustion engine, specifically, the degradation of a low temperature activation capability of the exhaust gas purifying catalyst. In order to achieve this object, the catalyst degradation detecting device of the internal combustion engine of the present invention includes an adsorbent provided in the exhaust passage at downstream of the exhaust gas purifying catalyst, for adsorbing a predetermined component contained in the exhaust gas when a temperature is lower than a predetermined temperature range, and desorbing the adsorbed predetermined component when the temperature is within the predetermined temperature range; an adsorbing amount detector for detecting the amount of the predetermined component adsorbed in the adsorbent; and a catalyst degradation determining device for determining the degradation of the exhaust gas purifying catalyst based on a predetermined component adsorbing amount detected by the adsorbing amount detector.

5 Claims, 11 Drawing Sheets

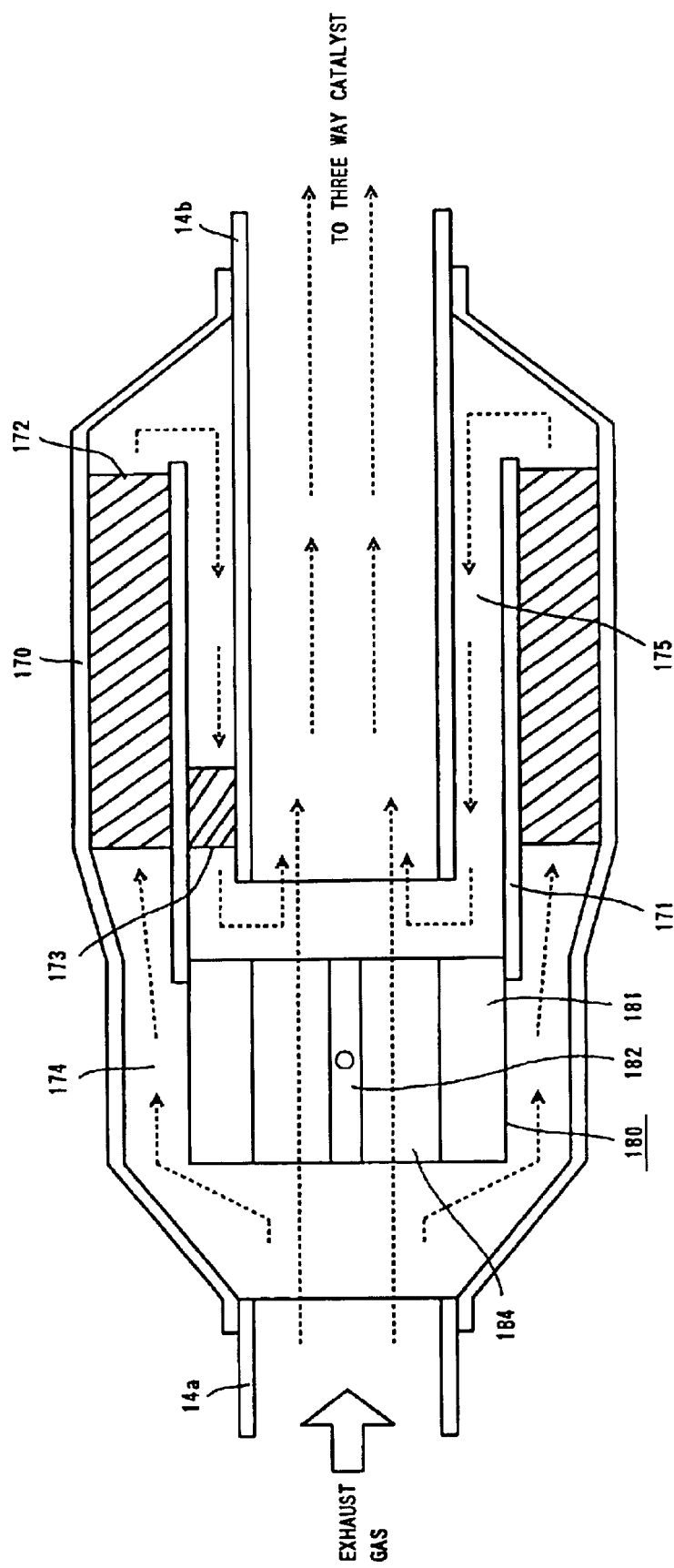
F I G. 4

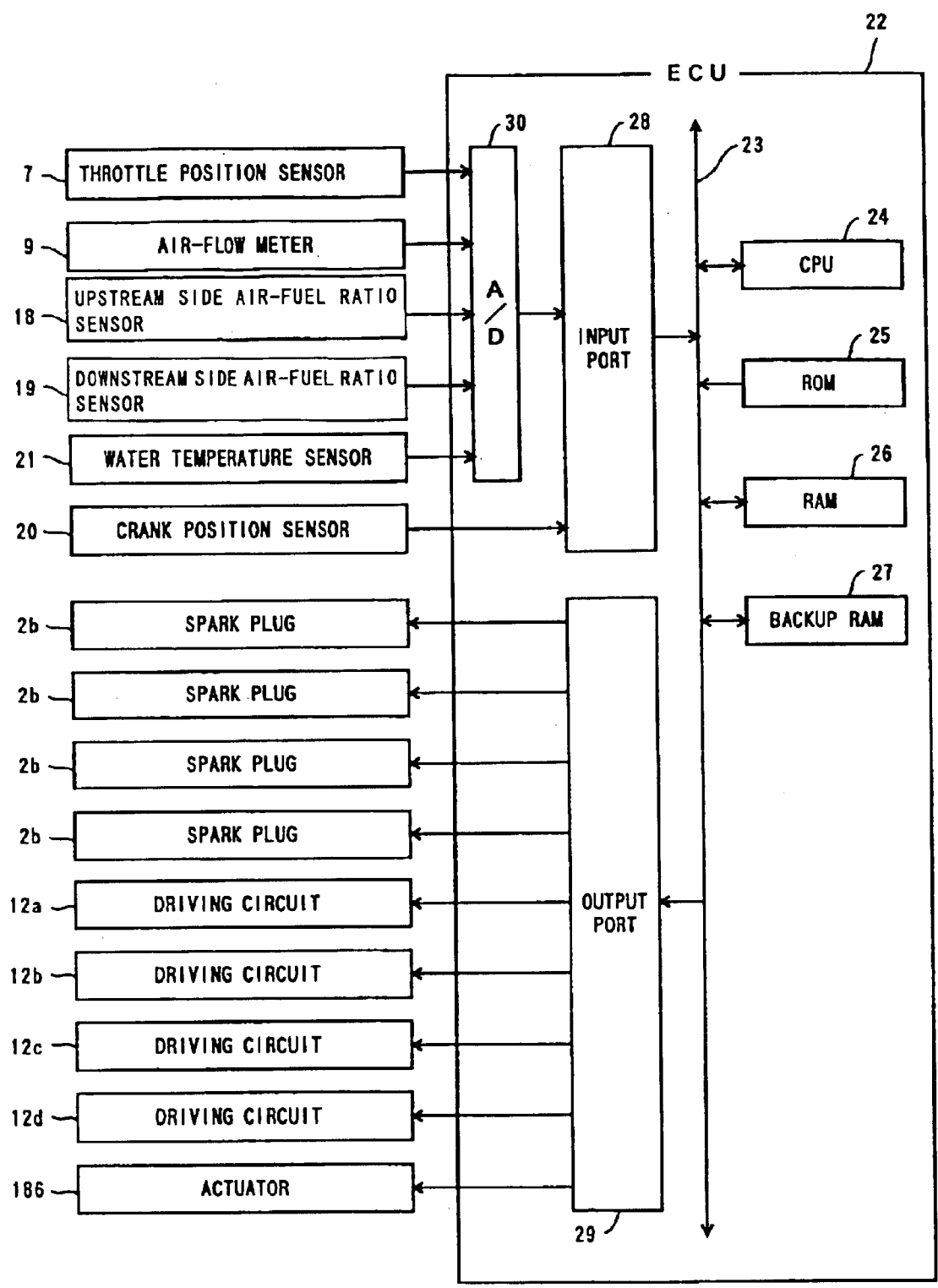
F I G. 5

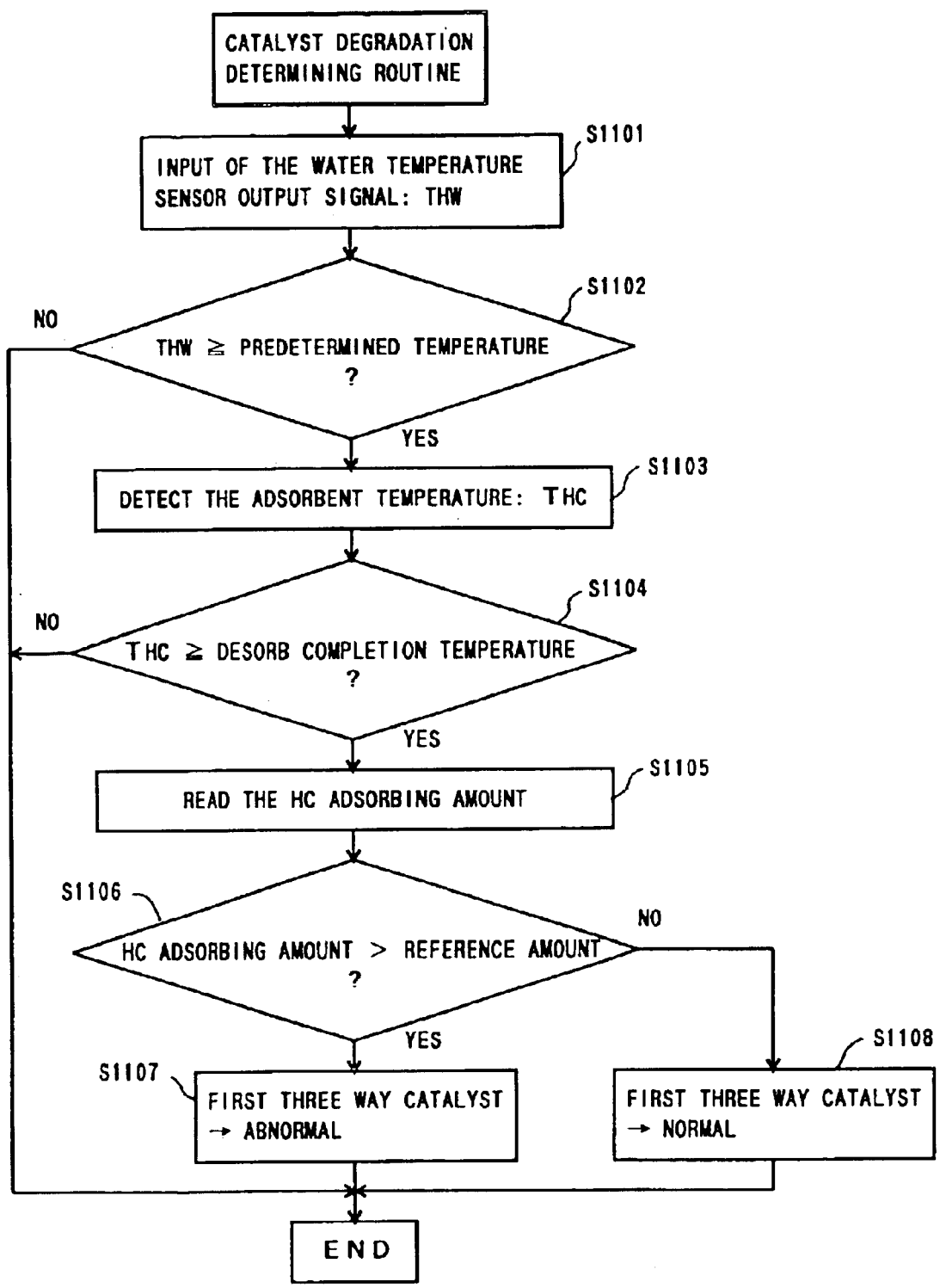
F I G. 1 1

CATALYST DEGRADATION DETECTING DEVICE AND METHOD THEREOF IN INTERNAL COMBUSTION ENGINE

BACKGROUND OF THE INVENTION

1. Field of the Invention

The present invention relates to a technology for detecting a degradation of an exhaust gas purifying catalyst provided in an exhaust passage of an internal combustion engine.

2. Description of Related Art

In an internal combustion engine arranged in an automobile or the like, an exhaust gas purifying catalyst is provided in an exhaust passage of the internal combustion engine, for the purpose of purifying harmful gas components contained exhaust gases. As this type of exhaust gas purifying catalyst known is, for example, a three way catalyst constituted in such a manner that alumina is coated on the surface of a ceramic carrier, and a platinum-rhodium or palladium-rhodium noble metal is carried on the surface of the alumina.

The three way catalyst is an exhaust gas purifying catalyst that makes hydrocarbons (HC) and carbon monoxide (CO) contained in exhaust gases react with oxygen ($O_2$) in the exhaust gases to reduce them to water ($H_2O$) and carbon dioxide ($CO_2$), and at the same time that makes nitrogen oxides ($NO_x$) contained in the exhaust gases react with hydrocarbons (HC) and carbon monoxide (CO) in the exhaust gases to reduce them to water ($H_2O$), carbon dioxide ($CO_2$), and nitrogen ($N_2$) when an air-fuel ratio of flowing-in exhaust gases is in the vicinity of the theoretical air-fuel ratio.

By this type of three way catalyst, hydrocarbons (HC), carbon monoxide (CO), and nitrogen oxides ($NO_x$) contained in the exhaust gases may be purified, and harmful gas components are prevented from being discharged to the atmosphere.

The three way catalyst is activated at a predetermined activation temperature (e.g. 300 to 500° C.) or higher to be capable of purifying harmful gas components in the exhaust gases, but it is not capable of purifying hydrocarbons (HC), carbon monoxide (CO), and nitrogen oxides ($NO_x$) in the exhaust gases at a temperature lower than the aforementioned activation temperature since it becomes in an inactivated state.

Particularly, in the case in which an internal combustion engine is cold started or the like, a fuel injection amount is increased more than usual in order to improve the startability and to ensure operability of the internal combustion engine, whereas since the combustion of an air-fuel mixture in the internal combustion engine becomes unstable, the amount of unburned fuel component (unburned HC) contained in the exhaust gases become relatively large. At that time an inconvenience occurs that if the three way catalyst is in the inactivated state, a relatively large amount of unburned HC cannot be purified and the unburned HC is discharged to the atmosphere.

With respect to this type of problem, to date, an exhaust gas purifying device is proposed in which an HC adsorbent that is composed of porous zeolite or the like adsorbs the unburned HC in the exhaust gases at a temperature lower than a predetermined temperature and desorbs the adsorbed unburned HC at a temperature equal to or higher than the predetermined temperature, and the adsorbent and the three way catalyst are provided in an exhaust passage. In this exhaust gas purifying device, when the three way catalyst is in the inactivated state, the unburned HC in the exhaust gases is adsorbed in the HC adsorbent, and after the three way catalyst is activated, the unburned HC in the exhaust gases and the unburned HC desorbed from the HC adsorbent are purified through the three way catalyst.

In the exhaust gas purifying device as mentioned above, it is important to accurately determine the performance degradation of the three way catalyst. For this type of requirement, "Catalyst degradation determination device in an internal combustion engine" disclosed in the Japanese Patent Application Laid-Open Publication No. Hei 5-98948 is known.

The catalyst degradation determination device mentioned above comprises a three way catalyst provided in an exhaust passage of an internal combustion engine and having an oxygen storage capacity (OSC), an upstream side air-fuel ratio sensor provided in the exhaust passage at the upstream of the three way catalyst, a downstream side air-fuel ratio sensor provided in the exhaust passage at the downstream of the three way catalyst, an air-fuel ratio feedback control means that feedback controls an engine air-fuel ratio based on an output signal value of the upstream side air-fuel ratio sensor, a locus length calculating means that calculates a locus length of an output of the downstream side air-fuel ratio sensor during a predetermined period of time when the air-fuel ratio feedback control means executes an air-fuel ratio feedback control, and a catalyst degradation judging means that judges that the three way catalyst is degraded when the locus length calculated by means of the locus length calculating means is greater than a predetermined reference value.

That is, the catalyst degradation determination device described above integrates, during the predetermined period of time in which the air-fuel ratio feedback control is executed, the amount of change of the output of the downstream side air-fuel ratio sensor for each constant time period (< the predetermined period of time) and determines that the three way catalyst is degraded when the integrated value is greater than the reference value.

The above functions are executed based on the knowledge that when the three way catalyst is degraded, the frequency of the change of the output of the downstream side air-fuel ratio sensor becomes higher than that of the case in which the three way catalyst is normal and, as a result, an integrated value of the amount of change of the output of the downstream side air-fuel ratio sensor during the predetermined period of time when the three way catalyst is degraded becomes greater than that of the case where the three way catalyst is normal.

In recent years, since an improvement in an exhaust emission exhausted when an internal combustion engine is cold started is required, it is important to determine the degradation of the capability of activating a catalyst under a low temperature state in an earlier stage, that is, a low temperature activation capability.

However, in the catalyst degradation determination device described above, the degradation determination of the exhaust gas purifying catalyst is made at the time of execution of the air-fuel ratio feedback control after the exhaust gas purifying catalyst is activated, and it is impossible to diagnose the degradation of the low temperature activation capability of the exhaust gas purifying catalyst, and there is a possibility that the exhaust emission is worsened when the internal combustion engine is cold started.

SUMMARY OF THE INVENTION

The present invention is made in view of the above-mentioned problems, and it is an object of the present invention to contribute to the prevention of worsening the exhaust emission when an internal combustion engine is cold started, by providing a technology for accurately determining the degradation of an exhaust gas purifying catalyst provided in an exhaust passage of the internal combustion engine and is capable of purifying harmful gas components in exhaust gases at a predetermined activation temperature or higher, particularly, the degradation of a low temperature activation capability.

In order to achieve the object, the present invention adopts the following means.

That is, the catalyst degradation detecting device in an internal combustion engine according to the present invention comprises an adsorbing member provided in an exhaust passage of the internal combustion engine, for adsorbing a predetermined component contained in exhaust gases when a temperature is lower than a predetermined temperature and desorbing the adsorbed predetermined component when the temperature is within a predetermined temperature range; an exhaust gas purifying catalyst provided in the exhaust passage at least at the upstream of the adsorbing member for purifying the predetermined component in the exhaust gases when the temperature is equal to or higher than the predetermined activation temperature; an adsorbing amount detection device for detecting the amount of the predetermined component adsorbed by the adsorbing member; and a catalyst degradation determining device for determining the degradation of the exhaust gas purifying catalyst based on the amount of the predetermined component detected by the adsorbing amount detection device.

With the catalyst degradation detecting device in the internal combustion engine structured as described above, the catalyst degradation determining device determines the degradation of the exhaust gas purifying catalyst based on the amount of the predetermined component adsorbed by the adsorbing member when the temperature of the adsorbing member is lower than the predetermined temperature range.

In the case where the internal combustion engine is started under a condition in which the temperature of the adsorbing member is lower than the predetermined temperature range and the temperature of the exhaust gas purifying catalyst is lower than the activation temperature, during the process in which the temperature of the adsorbing member increases to the predetermined temperature range, in other words, during the process in which the adsorbing member adsorbs the predetermined component contained in the exhaust gases, that is, during the time period in which the temperature of the exhaust gas purifying catalyst is lower than the activation temperature (catalyst inactivated period), nearly all of the predetermined component contained in the exhaust gases exhausted from the internal combustion engine reaches the adsorbing member without being purified by the exhaust gas purifying catalyst.

In the process in which the adsorbing member adsorbs the predetermined component contained in the exhaust gases, after the temperature of at least part of the exhaust gas purifying catalyst becomes equal to or higher than the activation temperature, at least part of the predetermined component contained in the exhaust gas is purified by the exhaust gas purifying catalyst, the amount of predetermined component reaching the adsorbing member decreases.

At that time, as the exhaust gas purifying catalyst comes to be degraded, specifically the low temperature activation capability of the exhaust gas purifying catalyst comes to be degraded, the catalyst inactivated period becomes longer in the process in which the adsorbing member adsorbs the predetermined component contained in the exhaust gases, and the longer the catalyst inactivated period, the more the amount of the predetermined component reaching the adsorbing member increases. As a result, the amount of the predetermined component adsorbed in the adsorbing member increases.

Accordingly, the catalyst degradation determining device can determine that the exhaust gas purifying catalyst is degraded when the amount of predetermined component that was adsorbed in the adsorbing member increases more than that in the normal state of the exhaust gas purifying catalyst.

In the catalyst degradation detecting device in the internal combustion engine according to the present invention, the degradation determination of the exhaust gas purifying catalyst is made using the amount of the predetermined component that was actually adsorbed in the adsorbing member during the process of adsorbing the predetermined component by the adsorbing member, as a parameter, thereby the degradation of the exhaust gas purifying catalyst capable of purifying harmful gas component of exhaust gases at a temperature equal to or higher than the predetermined activation temperature, can be determined, specifically the degradation of the low temperature activation capability can be accurately determined.

The internal combustion engine to which the present invention is applied may further comprise a first exhaust gas purifying catalyst provided in the exhaust passage at the upstream of the adsorbing member; a second exhaust gas purifying catalyst provided in the exhaust passage at the downstream of the adsorbing member; a predetermined component amount detecting device provided in the exhaust passage located at more downstream than the adsorbing member but more upstream than the second exhaust gas purifying catalyst, for detecting the predetermined component amount contained in the exhaust gases flowing into the second exhaust gas purifying catalyst; and a fuel injection amount correction device for correcting the fuel injection amount of the internal combustion engine and regulates the predetermined component amount exhausted from the internal combustion engine so that the detected amount of the predetermined component amount detecting device can be a desired predetermined component amount.

In this case, the adsorbing amount detecting device according to the present invention may be adapted to detect the predetermined component amount adsorbed in the adsorbing member based on a corrected amount effected by the fuel injection amount correction device during desorption of the predetermined component by the adsorbing member.

The catalyst degradation detecting device in the internal combustion engine according to the present invention may further comprise a temperature detection device detecting the temperature of the adsorbing member. In this case, the adsorbing amount detecting device may be adapted to accumulate corrected amounts effected by the fuel injection amount correction device during the time period when the detected value of the temperature detecting device falls into said predetermined temperature range and to calculate the amount of the predetermined component that was adsorbed in the adsorbing member, that is, during the time period when the adsorbing member desorbs the predetermined component, and the catalyst degradation determining device may be adapted to determine that the first exhaust gas purifying catalyst is degraded when the amount of predetermined component calculated by the adsorbing amount detection device exceeds a predetermined reference.

The adsorbing member according to the present invention may be an HC adsorbent adsorbing the unburned hydrocarbon contained in the exhaust gases or a $NO_x$ adsorbent adsorbing nitrogen oxide contained in the exhaust gases.

BRIEF DESCRIPTION OF THE DRAWINGS

FIG. 4 is a view explaining the operation of the adsorbing mechanism.

FIG. 5 is a block diagram showing the internal structure of an ECU.

FIG. 11 is a flowchart showing a catalyst degradation judging routine.

DETAILED DESCRIPTION OF THE PREFERRED EMBODIMENTS

Now, specific embodiments of the catalyst degradation detecting device in an internal combustion engine according to the present invention will be described referring to the accompanying drawings.

Figure 1:
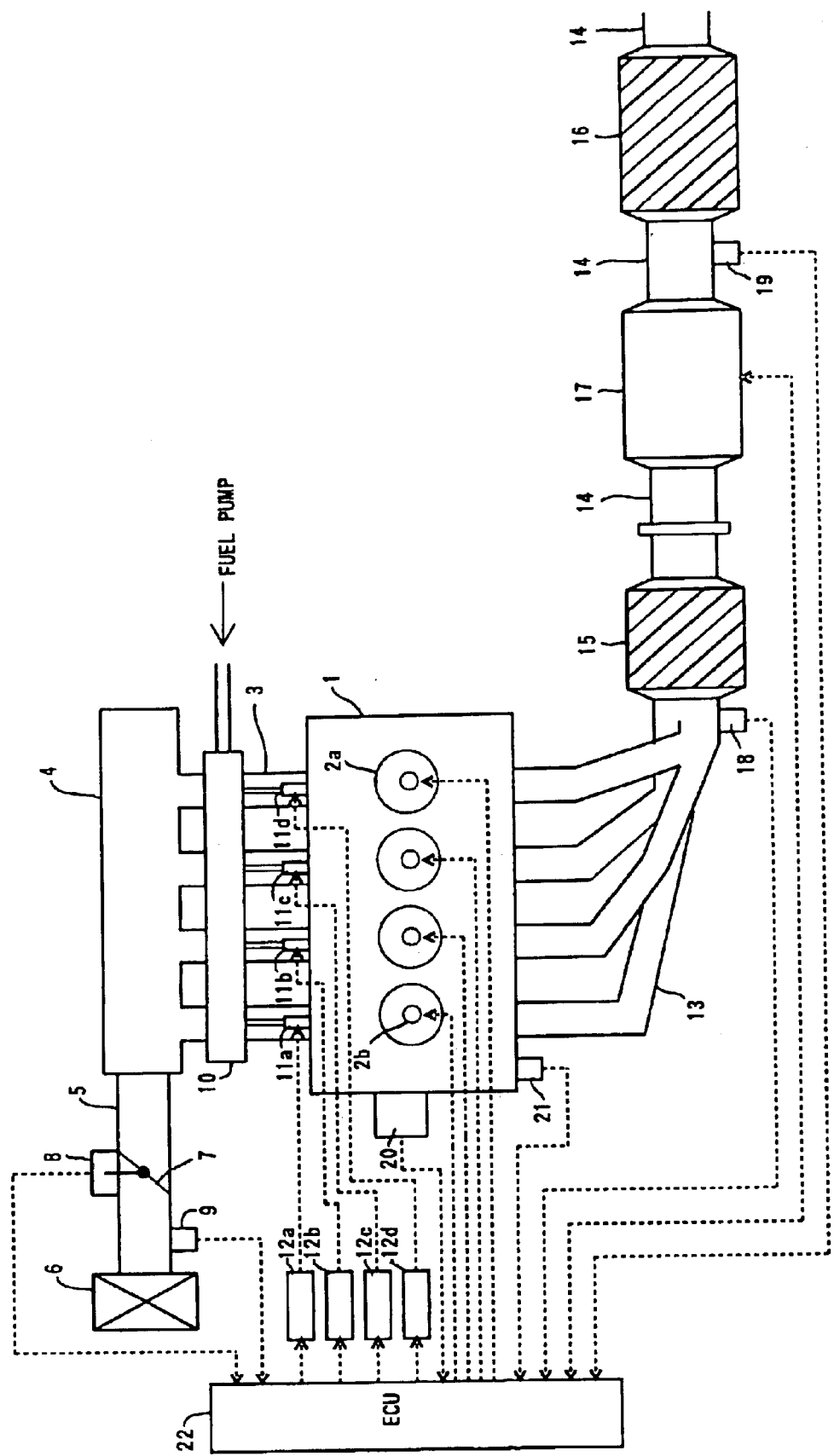
FIG. 1 is a schematic view showing the structure of the internal combustion engine to which the catalyst degradation detecting device according to the present invention is applied.

FIG. 1 is a schematic view showing the structure of the internal combustion engine to which the catalyst degradation detecting device according to the present invention is applied and an intake and exhaust system thereof.

An internal combustion engine 1 shown in FIG. 1 is a four cycle water cooled type gasoline engine with four cylinders 2a. In this internal combustion engine 1, ignition plugs 2b are attached to face a combustion chamber of each cylinder 2a, respectively.

Intake manifolds 3 are connected to the internal combustion engine 1, and each branch pipe of the intake manifold 3 communicates with the combustion chamber of each cylinder 2a via unillustrated intake ports.

The intake manifolds 3 are connected to a surge tank 4, and the surge tank 4 is connected to an air cleaner box 6 via an intake pipe 5.

The intake pipe 5 is provided with a throttle valve 7 regulating an intake flow rate flowing inside the intake pipe 5 by interlocking with an unillustrated accelerator.

The throttle valve 7 is provided with a throttle position sensor 8 outputting an electric signal corresponding to a degree of opening of the throttle valve 7.

In the intake pipe 5, an air flow meter 9 outputting an electric signal corresponding to the mass of the intake air flowing inside the intake pipe 5 is attached at a position located in the upstream of the throttle valve 7.

Fuel injection valves 11a, 11b, 11c, 11d (hereafter, generally called the fuel injection valve 11), each injecting a fuel toward the intake port of each cylinder 2a is attached to each branch pipe of the intake manifolds 3.

Each fuel injection valve 11 communicates with a fuel distribution pipe 10, and the fuel distribution pipe 10 communicates with an unillustrated fuel pump. The fuel discharged from the fuel pump is supplied to the fuel distribution pipe 10 and then is distributed from the fuel distribution pipe 10 to each fuel injection valve 11.

Each fuel injection valve 11 is connected to each of driving circuits 12a, 12b, 12c, 12d (hereafter, generally called the driving circuit 12) via an electric wiring, and when the driving current is applied from the driving circuit 12 to the fuel injection valve 11, the fuel injection valve 11 is opened to inject fuel.

Exhaust manifolds 13 are connected to the internal combustion engine 1, and each branch pipe of the exhaust manifold 13 communicates with the combustion chamber of each cylinder 2a via unillustrated exhaust ports. The exhaust manifolds 13 are connected to an exhaust pipe 14, and the exhaust pipe 14 is connected, at its downstream to an unillustrated muffler.

In the collecting part of the all branch pipes of the exhaust manifold 13, an upstream side three way catalyst 15 is provided as the upstream side exhaust gas purifying catalyst according to the present invention. A downstream side three way catalyst 16 is provided in the midway of the exhaust pipe 14 as the downstream side exhaust gas purifying catalyst according to the present invention.

The upstream side three way catalyst 15 and the downstream side three way catalyst 16 are each comprising a ceramic carrier consists of a cordierite formed in a grating so as to have a plurality of through holes along a direction of flowing of the exhaust gas, and a catalyst layer coated on the surface of the ceramic carrier. The catalyst layer is formed in such a manner that, for example, a platinum-rhodium (Pt—Rh) or palladium-rhodium (Pd—Rh) noble metal catalyst material is carried on the surface of porous alumina (Al2O3) having many pores.

The upstream side three way catalyst 15 and the downstream side three way catalyst 16 structured as described above are activated at a temperature equal to or higher than a predetermined temperature, and when the air-fuel ratio of the exhaust gas flowing into the upstream side three way catalyst 15 and the downstream side three way catalyst 16 is in the vicinity of a desired air-fuel ratio, these catalysts have hydrocarbons (HC) and carbon monixide (CO) contained in exhaust gases react with oxygen $O_2$ in the exhaust gases to reduce them to $H_2O$ and $CO_2$, and, at the same time, have $NO_x$ contained in the exhaust gases react with HC and CO in the exhaust gases to reduce them to $H_2O$, $CO_2$, and $N_2$ when the air-fuel ratio of flowing exhaust gases is adjacent to a theoretical air-fuel ratio.

To the exhaust manifold 13 located upstream of the upstream side three way catalyst 15, attached is a first air-fuel ratio sensor 18 outputting an electric signal corresponding to the air-fuel ratio of the exhaust gas flowing through the exhaust manifold 13.

To the exhaust pipe 14 located upstream of the downstream side three way catalyst 16, attached is a second air-fuel ratio sensor 19 outputting an electric signal corresponding to the air-fuel ratio of the exhaust gas flowing through the exhaust pipe 14. This second air-fuel ratio sensor 19 is an embodiment of the predetermined component amount detecting device according to the present invention.

The first and second air-fuel ratio sensors 18, 19 are, each formed of, for example, a solid electrolyte part that is made in baking zirconia ($ZrO_2$) into a cylindrical shape, an external platinum electrode covering the outer face of the solid electrolyte part, and an internal platinum electrode covering the inner face of the solid electrolyte part. These sensors 18, 19 output a voltage with a value proportional to the oxygen concentration (the concentration of an unburned gas component when in the rich side of the air-fuel ratio against the theoretical air-fuel ratio) in the exhaust gases according to the movement of oxygen ions when a voltage is applied between the electrodes.

In the exhaust pipe 14, an adsorbing mechanism 17 is provided at a position located upstream of the second air-fuel ratio sensor 19.

Figure 2:
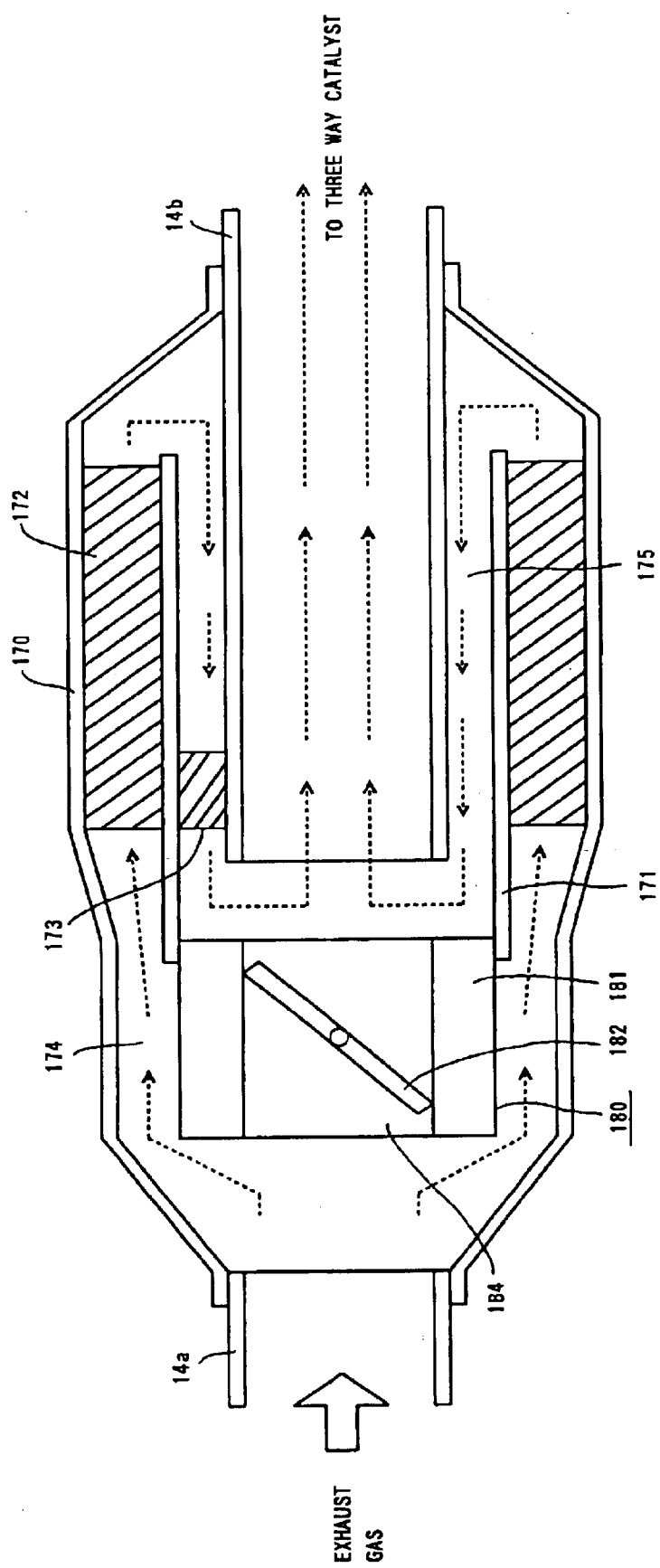
FIG. 2 is a view showing the internal structure of an adsorbing mechanism (1).

The adsorbing mechanism 17 includes an outer casing 170 with an inner diameter larger than the outer diameter of the exhaust pipe 14 and an intermediate casing 171 with an outer diameter smaller than the inner diameter of the outer casing 170, as shown in FIG. 2.

An HC adsorbent 172, as an adsorbing member according to the present invention, is arranged in an annular space 174 formed between the intermediate casing 171 and the outer casing 170.

The exhaust pipe 14 is divided into an upstream side exhaust pipe 14a and a downstream side exhaust pipe 14b in the outer casing 170, and the upstream side exhaust pipe 14a and the downstream side exhaust pipe 14b are connected via the outer casing 170.

The open end of the upstream side of the downstream side exhaust pipe 14b extends into the outer casing 170, and the tip portion thereof is held inside the outer casing 170 so as to be a non-fixed end. Correspondingly, the intermediate casing 171 is held inside the outer casing 170 so that one end of the intermediate casing 171 is fixed to either the outer casing 170, the exhaust pipe 14, or a valve device 180 that will be described later, the other end of the intermediate casing 171 is not fixed to any of the outer casing 170, the exhaust pipe 14 and the valve device 180, and the upstream side end of the intermediate casing 171 is so held in the outer casing 170 to extend to the upstream side of the upstream side end of the downstream side exhaust pipe 14b.

This structure is made because the temperature of the outer casing 170 tends to be lower compared with those of the intermediate casing 171 and the downstream side exhaust pipe 14b, and if the outer casing 170 is fixed to the upstream side exhaust pipe 14a and the downstream side exhaust pipe 14b and, in addition, both ends of the intermediate casing 171 or the upstream side end of the downstream side exhaust pipe 14b are/is directly fixed or indirectly fixed via the valve device 180 to the outer casing 170, there is a possibility that the adsorbing mechanism 17 may be broken due to differential thermal expansions of the outer casing 170, the intermediate casing 171, and the downstream side exhaust pipe 14b, thereby causing lowering of the durability.

The HC adsorbent 172 is fixed to only one of the outer casing 170 and the intermediate casing 171 so that differential thermal expansions due to the temperature difference between the outer casing 170 and the intermediate casing 171 can be allowed.

The HC adsorbent 172 is consisting of, for example, a material that includes zeolite as a main body, adsorbs unburned HC in the exhaust gases when its temperature is lower than the predetermined temperature range, and desorbs the adsorbed unburned HC when the temperature is increased to the predetermined temperature range.

Holding members 173 are arranged at a plurality of positions in a space 175 between the intermediate casing 171 and the downstream side exhaust pipe 14b in order to improve the vibration resistant property of the downstream side exhaust pipe 14b.

The holding member 173 is fixed to only one of the inner wall of the intermediate casing 171 and the outer wall of the downstream side exhaust pipe 14b so that the intermediate casing 171 and the downstream side exhaust pipe 14b are in a non-fixed condition mutually, whereby differential thermal expansions of the downstream side exhaust pipe 14b and the intermediate casing 171 in the axial direction can be absorbed.

The holding member 173 may be fixed to the inner wall of the intermediate casing 171 and the outer wall of the downstream side exhaust pipe 14b, respectively, depending on the shape and material of the holding member 173.

Figure 3:
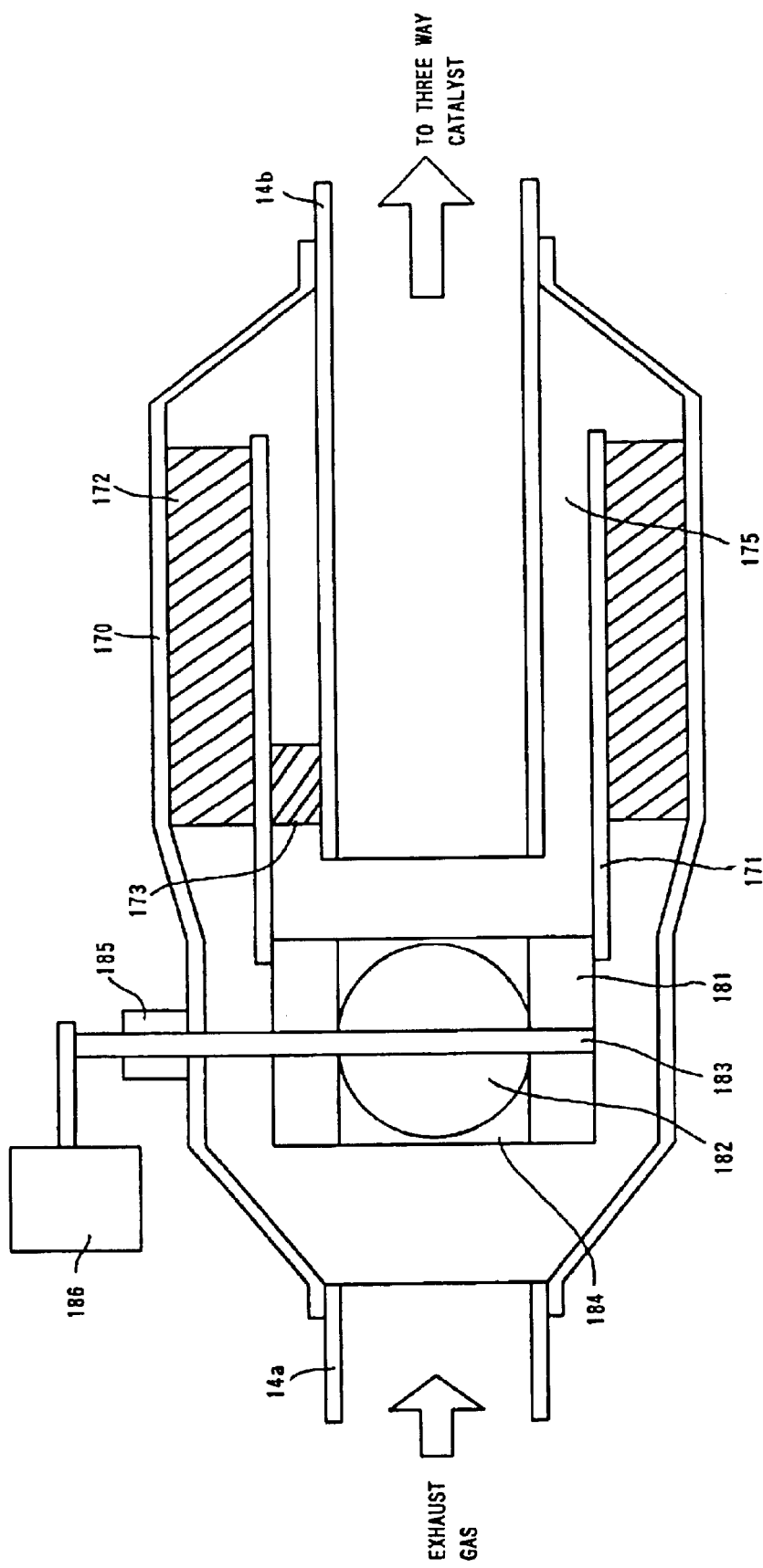
FIG. 3 is a view showing the internal structure of an adsorbing mechanism (2).

The valve device 180 is provided in the upstream side open end of the intermediate casing 171 to open/close the open end thereof. The valve device 180 is constructed with a butterfly type two-way valve as shown in FIG. 3.

Specifically, the valve device 180 comprises a housing 181 fitted into the upstream side open end of the intermediate casing 171, a path 184 through the housing 181 in the axial direction, a valve body 182 for opening/closing the path 184, and a shaft 183 integrally fixed to the valve body 182.

One end of the shaft 183 is rotatably supported on the housing 181, and the other end of the shaft 183 is rotatably supported by a bearing 185 provided on the outer wall of the outer casing 170.

The other end of the shaft 183 is connected to an actuator 186 via a linkage or the like. The actuator 186 is composed of a stepping motor and the like and rotatably drives the shaft 183 according to the amount of the applied current.

Since the shaft 183 and the valve body 182 are integrally fixed, when the actuator 186 rotatably drives the shaft 183, the valve body 182 executes opening/closing operations.

In the adsorbing mechanism 17 structured as described above, when the upstream side three way catalyst 15 and the downstream side three way catalyst 16 are in the inactivated state, the actuator 186 is controlled so that the valve body 182 of the valve device 180 is totally closed as shown in FIG. 2.

In this case, since the exhaust passage (main exhaust path) communicating from the upstream side exhaust pipe 14a via the path 184 to the downstream side exhaust pipe 14b becomes a non-conductive state, all exhaust gas flowed from the upstream side exhaust pipe 14a into the adsorbing mechanism 17 is led into the annular space 174 formed between the intermediate casing 171 and the outer casing 170.

The exhaust gas led into the space 174, after passing through the HC adsorbent, collides with the inner wall of the outer casing 170, changes the flow direction, and is led into the annular space 175 formed between the intermediate casing 171 and the downstream side exhaust pipe 14b.

The exhaust gas led into the space 175 flows through the space 175 from the downstream side to the upstream side of the adsorbing mechanism 17. The exhaust gas passed through the space 175 collides with the valve device 180, changes the flow direction again, and flows into the downstream side exhaust pipe 14b. Hereinafter, the passage (an exhaust passage communicating from the upstream side exhaust pipe 14a to the downstream side exhaust pipe 14b via the space 174 and the space 175) will be called a bypass path.

When the valve body 182 of the valve device 180 is totally closed, all exhaust gas flowed into the adsorbing mechanism 17 flows through the bypass path, so that the unburned HC contained in the exhaust gas is absorbed in the HC absorbent 172 in the bypass path.

In the adsorbing mechanism 17, after the downstream side three way catalyst 16 is activated, the actuator 186 is controlled so that the valve body 182 of the valve device 180 is fully opened as shown in FIG. 4.

In this case, in the adsorbing mechanism 17, the main exhaust path communicating from the upstream side exhaust pipe 14a via the path 184 to the downstream side exhaust pipe 14b is in a conductive state, and the bypass path communicating from the upstream side exhaust pipe 14a via the space 174 and the space 175 to the downstream side exhaust pipe 14b is also in the conductive state.

Since the adsorbing mechanism 17 of this embodiment is structured in such a manner that the exhaust resistance of the bypass path is greater than the exhaust resistance of the main exhaust path, most of the exhaust gas flowed into the adsorbing mechanism 17 from the upstream side exhaust pipe 14a flows through the main exhaust path, and only the remaining portion of exhaust gas flows through the bypass path.

The exhaust gas flowed through the main exhaust path flows into the downstream side three way catalyst 16, and hydrocarbons (HC), carbon monoxide (CO), and nitrogen oxides ($NO_x$) in the exhaust gas are purified at the downstream side three way catalyst 16. The exhaust gas flowing through the bypass path, after passing through the HC adsorbent 172, flows into the downstream side three way catalyst 16. When the exhaust gas passes through the HC adsorbent 172, the heat held by the exhaust gas is transmitted to the HC adsorbent 172, and the temperature of the HC adsorbent 172 increases. Then, when the temperature of the HC adsorbent 172 increases to the predetermined temperature range, the unburned HC that was adsorbed in the HC adsorbent 172 is released from the HC adsorbent 172. The unburned HC desorbed from the HC adsorbent 172, together with the exhaust gas flowing through the bypass path, flows into the downstream side three way catalyst 16, and is purified at the downstream side three way catalyst 16.

Now, returning to FIG. 1, a crank position sensor 20 is attached to the internal combustion engine 1. The crank position sensor 20 is consisting of a timing rotor attached to an end of an unillustrated crankshaft and an electromagnetic pickup attached to a cylinder block of the internal combustion engine 1 and outputs a pulse signal every time when the crank shaft rotates by a predetermined angle (e.g., 30°).

Attached to the internal combustion engine 1 is a water temperature sensor 21 that outputs an electric signal corresponding to the temperature of the cooling water flowing through in a water jacket formed at a cylinder block and a cylinder head of the internal combustion engine 1.

In the internal combustion engine 1 structured as described above, an Electronic Control Unit (ECU) 22 for controlling the internal combustion engine 1 is provided. To the ECU 22 connected are various sensors such as the throttle position sensor 8, the air flow meter 9, the first air-fuel ratio sensor 18, the second air-fuel ratio sensor 19, the crank position sensor 20, and the water temperature sensor 21 via electric wiring, and output signals of each sensor are input to the ECU 22.

To the ECU 22 also connected are the spark plugs 2b, the driving circuits 12, the actuator 186 of the valve device 180 via electric wiring, and the ECU 22 executes various controls such as an ignition control, a fuel injection control, an opening/closing control of the valve device 180.

As shown in FIG. 5, the ECU 22 comprises a CPU 24, a ROM 25, a RAM 26, a backup RAM 27, an input port 28, and an output port 29 that are connected with one another through a bidirectional bus 23, and an A/D converter (A/D) 30 is connected to the input port 28.

The input port 28 inputs the output signals in the form of sensor digital output signal such as outputted from the crank position sensor 20 and transmits these output signals to the CPU 24 and the RAM 26.

The input port 28 inputs, via the A/D converter 30, output signals of sensors that output analogue form signals such as outputted by the throttle position sensor 7, the air flow meter 9, the first air-fuel ratio sensor 18, the second air-fuel ratio sensor 19, and the water temperature sensor 21, and transmits these output signals to the CPU 24 or the RAM 26.

The output port 29 is connected via electric wiring to the spark plugs 2b, the driving circuits 12, and the actuator 186 of the valve device 180, and transmits control signals output from the CPU 24 to the spark plugs 2b, the driving circuits 12, and the actuator 186. The ROM 25 stores application programs for an ignition timing control routine for deciding an ignition timing of each spark plug 2b, a fuel injection amount control routine for deciding the fuel injection amount that is to be injected from each fuel injection valve 11, an air-fuel ratio feedback control routine for executing an air-fuel ratio feedback control of a fuel injection amount, a fuel injection timing control routine for deciding a fuel injection timing of each fuel injection valve 11, an adsorbing mechanism control routine for executing open/close controlling the valve device 180 of the adsorbing mechanism 17, and various kinds of control maps.

The control maps include, for example, an ignition timing control map showing the relationship between the operational state of the internal combustion engine 1 and the ignition timing, a fuel injection amount control map showing the relationship between the operational state of the internal combustion engine 1 and the fuel injection amount, a fuel injection timing control map showing the relationship between the operational state of the internal combustion engine 1 and the fuel injection timing, and an activation judgement control map showing the relationship between the temperature of the cooling water at the starting time of the internal combustion engine and the time required for the second three way catalyst 16 to be activated from the starting time (hereafter, it will be called a catalyst activation time).

The RAM 26 stores output signals from each sensor and the calculated results of the CPU 24. The calculated results are, for example, an engine speed calculated from the output signals of the crank position sensor 20. These data are updated every time the crank position sensor 20 outputs a signal.

The backup RAM 27 is a non-volatile memory capable of storing the data even after the internal combustion engine 1 stops operation.

The CPU 24 operates according to the application program stored in the ROM 25, determines the operational state of the internal combustion engine 1 by means of output signals of each sensor stored in the RAM 26, and from the operational state of the engine and each control map decides an ignition timing, a fuel injection amount, a fuel injection timing, an open/close timing of the valve device 180. The CPU 24 controls the spark plugs 2b, the driving circuits 12, and the actuator 186 according to the decided ignition timing, fuel injection amount, fuel injection timing, open/close timing of the valve device 180.

For instance, the CPU 24, when executing the fuel injection control, operates according to the fuel injection amount control routine and decides a fuel injection amount (fuel injection time) ATU according to the following equation for calculating a fuel injection amount.

$$TAU=TP*FWL*\{FAG+FG\}*(FASE+FAE+FOTP+FDE(D))*FFC+TAUV$$

(TP: basic injection amount, FWL: warming up amount increase, FAF: air-fuel ratio feedback correction factor, FG: air-fuel ratio learning coefficient, FASE: after start up amount increase, FAE: accelerating amount increase, FOTP: OTP amount increase, FDE(D): decelerating amount increase (amount decrease), FFC: fuel cut reset time correction factor, TAUV: invalid injection time).

At that time, the CPU 24 determines the operational state of the internal combustion engine, taking output signal values of various sensors as parameters, and calculates the aforementioned basic injection amount: TP, warming up amount increase: FWL, after start up amount increase: FASE, accelerating amount increase: FAE, OTP amount increase: FOTP, decelerating amount increase: FDE(D), fuel cut reset time correction factor: FFC, invalid injection time: TAUV and the like, based on the discriminated engine operational state and the fuel injection amount control map of the ROM 25.

Figure 6:
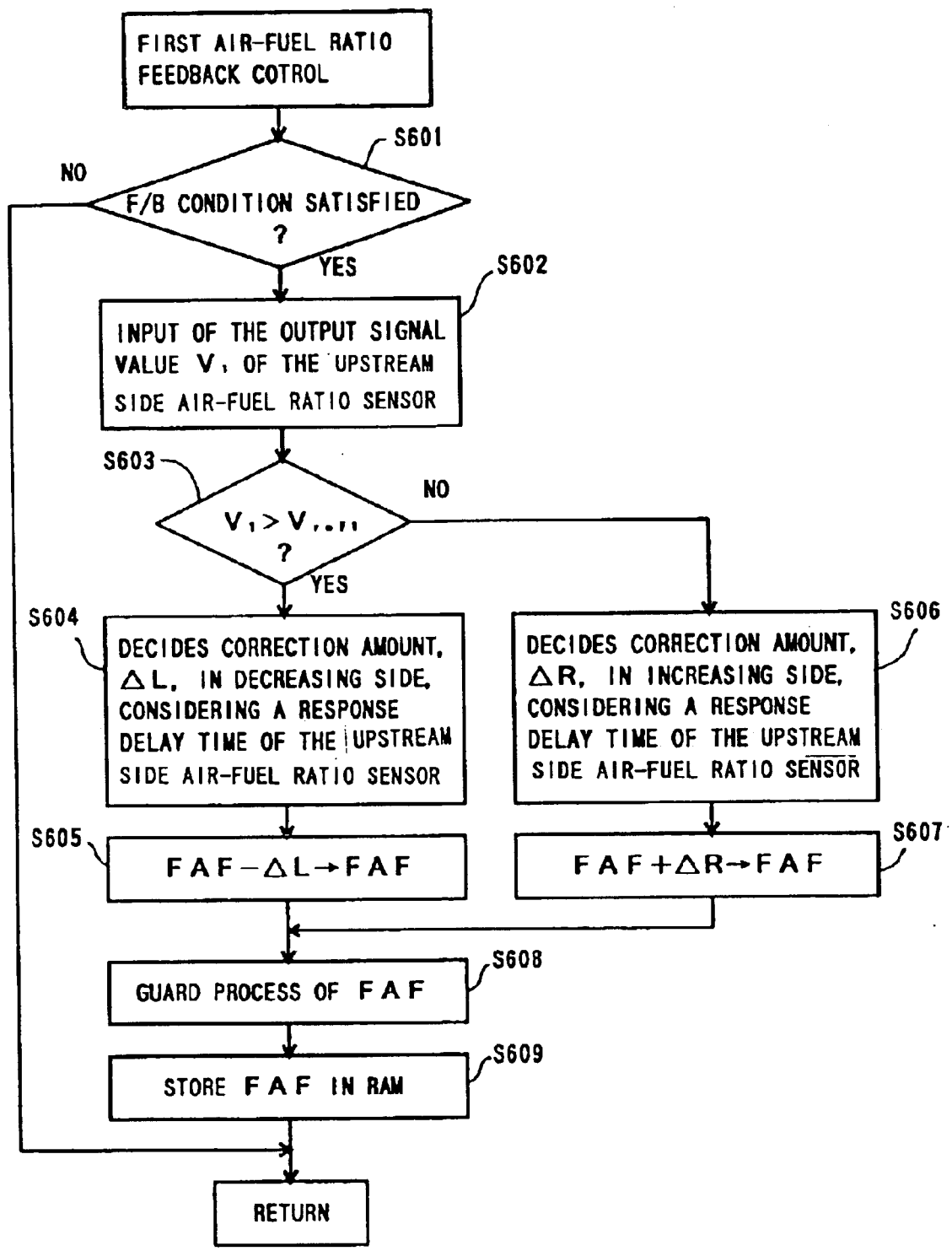
FIG. 6 is a flowchart showing a first air-fuel ratio feedback control routine.
Figure 7:
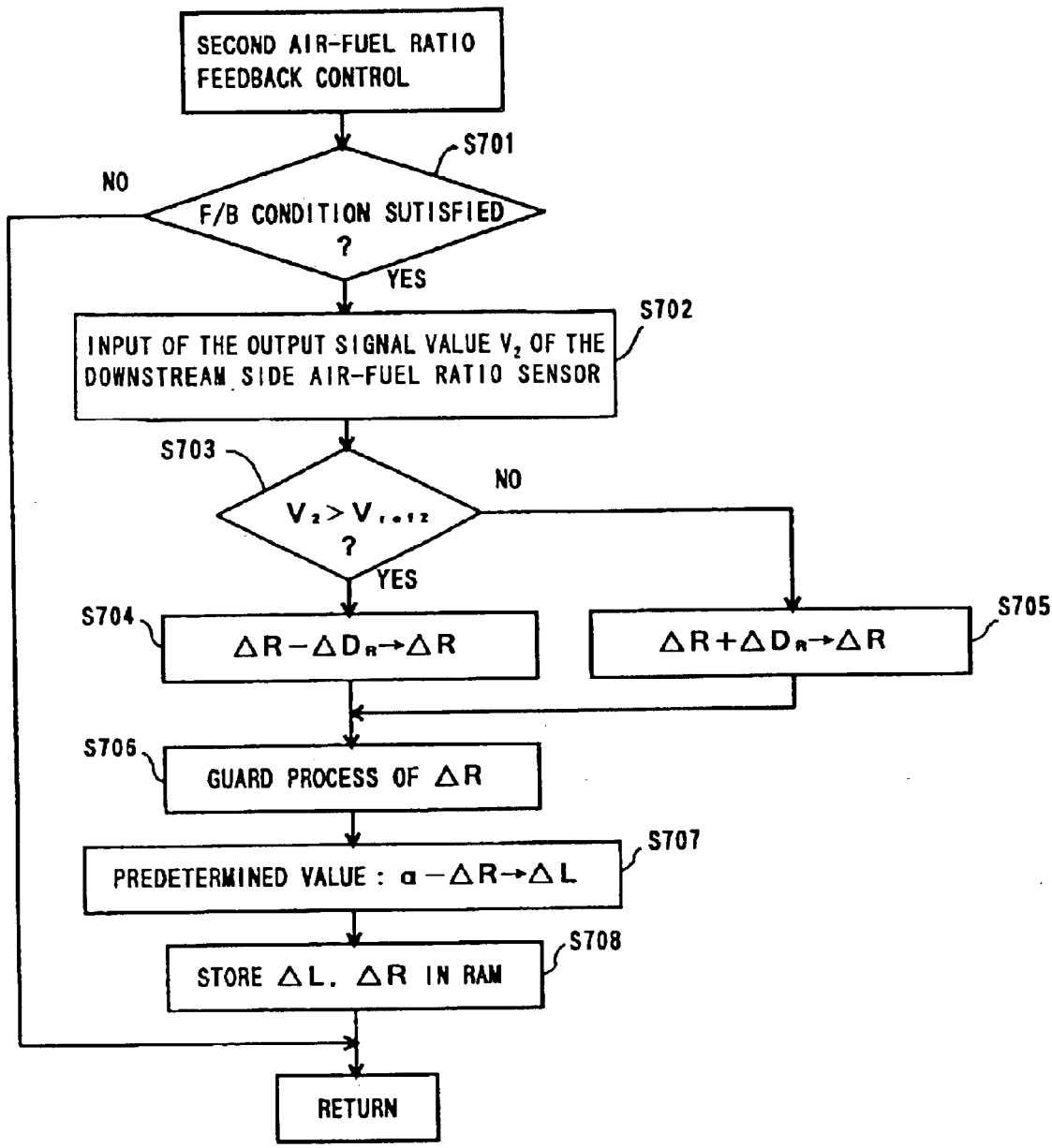
FIG. 7 is a flowchart showing a second air-fuel ratio feedback control routine.

The CPU 24 calculates the air-fuel feedback correction factor: FAF according to a first air-fuel ratio feedback control routine as shown in FIG. 6 and a second air-fuel ratio feedback control routine as shown in FIG. 7.

The first air-fuel ratio (feedback control routine is a routine that is repeatedly executed at every predetermined time (e.g., 4 ms).

In the first air-fuel ratio feedback control routine, the CPU 24, first at S601, determines whether or not the air-fuel ratio feedback control condition is satisfied, in other words, whether or not the closed-loop running condition of this routine is satisfied.

As the aforementioned air-fuel ratio feedback control condition, it includes, for example, a cooling water temperature is equal to or higher than a predetermined temperature (e.g., 70° C.), the internal combustion engine 1 is in the non-started state, the correction for the after start up amount increase of the fuel injection amount is in the non-executed state, the correction for the warming up amount increase of the fuel injection amount is in the non-executed state, the correction for the accelerating amount increase of the fuel injection amount is in the non-executed state, the correction for the OTP amount increase for prevention of overheat of the components of the exhaust gas system such as the first or second three way catalyst 15, 16 or the first or second air-fuel ratio sensor 18, 19 is in the non-executed state, and the fuel cut control is in the non-executed state.

At S601, if it is determined that the air-fuel ratio feedback control condition as described above is not satisfied, the CPU 24 sets the air-fuel ratio feedback correction factor, FAF, to "1.0" and finishes the execution of this routine. Then, re-executes this routine after the lapse of a predetermined period of time.

At S601, if it is determined that the air-fuel ratio feedback control condition is satisfied, the CPU 24 proceeds to S602 and inputs the output voltage, V1, of the first air-fuel ratio sensor 18 via the A/D converter 30 and the input port 28.

At S603, the CPU 24 compares the output voltage, V1, that was inputted in the S602 with a voltage (a first reference voltage), VREF1, that corresponds to a target air-fuel ratio at which the purifying rate of the first three way catalyst 15 becomes optimum, and determines whether or not the output signal value, V1, is higher than the first reference voltage, VREF1, that is, whether or not the air-fuel ratio of the exhaust gas flowing into the first three way catalyst 15 is richer than the target air-fuel ratio.

At S603, if it is determined that the output voltage, V1, of the first air-fuel ratio sensor 18 is higher than the first reference voltage, Vref1, that is, it is determined that the air-fuel ratio of the exhaust gas flowing into the first three way catalyst 15 is richer than the target air-fuel ratio, the CPU 24 proceeds to S604.

At S604, for the purpose of decreasing the fuel injection amount, TAU, the CPU 24 decides a correction amount, $\Delta L$, of the air-fuel ratio feedback correction factor, FAF. At that time, the CPU 24 decides the correction amount, $\Delta L$, by taking into consideration a response delay time of the first air-fuel ratio sensor 18.

At S605, the CPU 24 reads from the RAM 26 the air-fuel ratio feedback correction factor, FAF, that was decided when this routine was executed last time, subtracts the previous correction amount, $\Delta L$, from the air-fuel ratio feedback correction factor, FAF, and calculates a new air-fuel ratio feedback correction factor, FAF.

The CPU 24, after finishing the execution of process of S605, proceeds to S608 and executes an upper limit guard process and a lower limit guard process of the air-fuel ratio feedback correction factor, FAF, that was newly calculated at the S605.

At S609, the CPU 24 accesses the region in the RAM 26 in which the previous air-fuel ratio feedback correction factor, FAF, is stored, and rewrites the previous air-fuel ratio feedback correction factor, FAF, stored in the region to the air-fuel ratio feedback correction factor, FAF, that was guard processed at S608.

The CPU 24, after finishing the execution of the process of S609, re-executes the processes from S601, et seq. to continuously execute the closed-loop of this routine.

When the air-fuel ratio of the exhaust gas flowing into the first three way catalyst 15 is richer than the target air-fuel ratio, the air-fuel ratio feedback correction factor, FAF, is smaller than the previous air-fuel ratio feedback correction factor, FAF, and, as a result, the fuel injection amount, TAU, is decreased.

On the other hand, at S603, when it is determined that the output voltage V1 of the first air-fuel ratio sensor 18 is less than the first reference voltage, Vref1, that is, when it is determined that the air-fuel ratio of the exhaust gas flowing into the first three way catalyst 15 is leaner than the target air-fuel ratio, the CPU 24 proceeds to S606.

At S606, the CPU 24 decides the correction amount, $\Delta R$, of the air-fuel ratio feedback correction factor, FAF, for the purpose of increasing the fuel injection amount, TAU. At that time, the CPU 24 decides the correction amount, $\Delta R$, by taking into consideration the response delay time of the first air-fuel ratio sensor 18.

At S607, the CPU 24 reads from the RAM 26 the air-fuel ratio feedback correction factor, FAF, that was decided when this routine was executed last time, adds the correction amount, $\Delta R$, to the previous air-fuel ratio feedback correction factor, FAF, and calculates a new air-fuel ratio feedback correction factor, FAF.

The CPU 24, after finishing the execution of process of S607 proceeds to S608 and executes the upper limit guard process and the lower limit guard process of the air-fuel ratio feedback correction factor, FAF, that was newly calculated at S607.

At S609, the CPU 24 accesses the region in the RAM 26 in which the previous air-fuel ratio feedback correction factor, FAF, is stored and rewrites the previous air-fuel ratio feedback correction factor, FAF, stored in the region to the air-fuel ratio feedback correction factor, FAF, that was guard processed at S608.

The CPU 24, after finishing the execution of the process of S609, re-executes the processses from S601 et seq. to continuously execute the closed-loop of this routine.

When the air-fuel ratio of the exhaust gas flowing into the first three way catalyst 15 is leaner than the target air-fuel ratio, the air-fuel ratio feedback correction factor, FAF, is larger than the previous air-fuel ratio feedback correction factor, FAF, and, as a result, the fuel injection amount, TAU, is increased.

Next, the second air-fuel ratio feedback control routine as shown in FIG. 7 is a routine that is repeatedly executed every predetermined time (e.g., 512 ms).

In the second air-fuel ratio feedback control routine, the CPU 24, first at S701, determines whether or not the air-fuel ratio feedback control condition is satisfied, in other words, whether or not the closed-loop running condition of this routine is satisfied.

Here, the aforementioned air-fuel ratio feedback control condition includes, for example, a cooling water temperature is equal to or higher than the predetermined temperature (e.g., 70° C.), the degree of opening of the throttle valve 7 is not "0" (the throttle valve 7 is not in the totally closed state), the second air-fuel ratio sensor 19 is in the activated state.

At S701, if it is determined that the air-fuel ratio feedback control condition as described above is not satisfied, the CPU 24 finishes the execution of the this, and re-executes this routine after the lapse of a predetermined period of time.

At S701, if it is determined that the air-fuel ratio feedback control condition is satisfied, the CPU 24 proceeds to S702 and inputs the output voltage, V2, of the second air-fuel ratio sensor 19 via the A/D converter 30 and the input port 28.

At S703, the CPU 24 compares the output voltage, V2, that was input at S702 with a voltage VREF2 (a second reference voltage) that corresponds to the target air-fuel ratio at which the purifying rate of the second three way catalyst 16 becomes optimum, and determines whether or not the output signal value, V2, is higher than the second reference voltage, VREF2, that is, whether or not the air-fuel ratio of the exhaust gas flowing into the second three way catalyst 16 is richer than the target air-fuel ratio.

At S703, if it is determined that the output voltage, V2, of the second air-fuel ratio sensor 19 is higher than the second reference voltage, Vref2, that is, it is determined that the air-fuel ratio of the exhaust gas flowing into the second three way catalyst 16 is richer than the target air-fuel ratio, the CPU 24 proceeds to S704.

At S704, the CPU 24, in the first air-fuel ratio feedback control routine, reads from the RAM 26 a correction amount, $\Delta R$, that is used when correcting the air-fuel ratio feedback correction factor, FAF, to the amount increase side. The CPU 24 subtracts a predetermined amount, $\Delta DR$, from the read-out correction amount, $\Delta R$, and calculates a new correction amount, $\Delta R$.

The CPU 24, after finishing the execution of process of S704, proceeds to S706 and executes the upper limit guard process and the lower limit guard process of the correction amount, $\Delta R$, that was newly calculated at S704.

At S707, the CPU 24 calculates a new correction amount, $\Delta L$, so that the value obtained by adding the correction amount, $\Delta R$, that is used when correcting the air-fuel ratio feedback correction factor, FAF, to the amount increase side and the correction amount, $\Delta L$, that is used when correcting the air-fuel ratio feedback correction factor, FAF, to the amount decrease side, becomes a predetermined constant value, $\alpha$. That is, the CPU 24 calculates a new correction amount, $\Delta L$, by substituting the correction amount, $\Delta R$; that was guard processed at S705 in the equation, $\Delta R+\Delta L=\alpha$.

At S708, the CPU 24 rewrites the correction amounts, $\Delta R$, $\Delta L$, stored in the predetermined region of the RAM 26 to the new correction amounts, $\Delta R$, $\Delta L$, that are obtained at the S706 and S707.

The CPU 24, after finishing the execution of the process of S708, re-executes the processes from S701 et seq. to continuously execute the closed-loop routine.

When the air-fuel ratio of the exhaust gas flowing into the second three way catalyst 16 is richer than the target air-fuel ratio, correction is made so as to decrease the value of correction amount, $\Delta R$, that is used when correcting the air-fuel ratio feedback correction factor, FAF, to the amount increase side, and in accordance with the correction, correction is made so as to increase the value of correction amount, $\Delta L$, that is used when correcting the air-fuel ratio feedback correction factor, FAF, to the amount decrease side.

As a result, in the first air-fuel ratio feedback control routine, the correction amount, at the time of correcting the air-fuel ratio feedback correction factor, FAF, to the amount increase side, becomes smaller, whereas the correction amount, at the time of correcting the air-fuel ratio feedback correction factor, FAF, to the amount decrease side, becomes larger.

On the other hand, at S703, when it is determined that the output voltage V2 of the second air-fuel ratio sensor 19 is less than the second reference voltage, Vref2, that is, when it is determined that the air-fuel ratio of the exhaust gas flowing into the second three way catalyst 16 is leaner than the target air-fuel ratio, the CPU 24 proceeds to S705.

At S705, the CPU 24 accesses a predetermined region of the RAM 26 and reads the correction amount, $\Delta R$, that is used when correcting the air-fuel ratio feedback correction factor, FAF, to the amount increase side in the aforementioned first air-fuel ratio feedback control routine. The CPU 24 adds a predetermined amount, $\Delta DR$, to the previous correction amount, $\Delta R$, and calculates a new correction amount, $\Delta R$.

The CPU 24, after finishing the execution of process of S705 proceeds to S706 and executes the upper limit guard process and the lower limit guard process of the correction amount, $\Delta R$, that was calculated at S705.

At S707, the CPU 24 calculates a new correction amount, $\Delta L(=\alpha-\Delta R)$ by substituting the correction amount, $\Delta R$, that was guard processed at S705 in the equation, $\Delta R+\Delta L=\alpha$.

At S708, the CPU 24 rewrites the previous correction amounts, $\Delta R$, $\Delta L$, stored in the predetermined region of the RAM 26 to new correction amounts, $\Delta R$, $\Delta L$, that are obtained at S706 and S707.

The CPU 24, after finishing the execution of the process of S708, re-executes the processes from S701 et seq. to continuously execute the closed-loop routine.

As described above, when the air-fuel ratio of the exhaust gas flowing into the second three way catalyst 16 is leaner than the target air-fuel ratio, correction is made so as to increase the value of correction amount, $\Delta R$, that is used when correcting the air-fuel ratio feedback correction factor, FAF, to the amount increase side, and in accordance with the correction, correction is made so as to decrease the value of correction amount, $\Delta L$, that is used when correcting the air-fuel ratio feedback correction factor, FAF, to the amount decrease side.

As a result, in the first air-fuel ratio feedback control routine, the correction amount at the time of correcting the air-fuel ratio feedback correction factor, FAF, to the amount increase side, becomes larger, whereas the correction amount at the time of correcting the air-fuel ratio feedback correction factor, FAF, to the amount decrease side, becomes smaller.

After the air-fuel ratio feedback correction factor, FAF, is decided according to the aforementioned first and second feedback control routines, the CPU 24 calculates the fuel injection amount, TAU, by substituting the air-fuel ratio feedback correction factor, FAF, in the fuel injection amount calculating equation.

Then, the CPU 24 accesses the fuel injection timing control map, using the fuel injection amount, TAU, the engine speed, and the intake air amount (or the degree ° opening of the throttle value) as parameters to calculate a fuel injection start timing.

The CPU 24 monitors the rotational position of the crank shaft based on the output pulse of the crank position sensor 20 and controls the driving circuit 12 to start applying the driving current from the driving circuit 12 to the fuel injection valve 11 when the rotational position of the crank shaft coincides with the fuel injection start timing. After the lapse of time corresponding to the fuel injection amount (TAU), the CPU 24 controls the driving circuit 12 so as to stop applying the driving current from the driving circuit 12 to the fuel injection valve 11.

As described above, the fuel injection amount correcting device of the present invention is realized by executing the first and second air-fuel ratio feedback control routines by the CPU 24.

Figure 8:
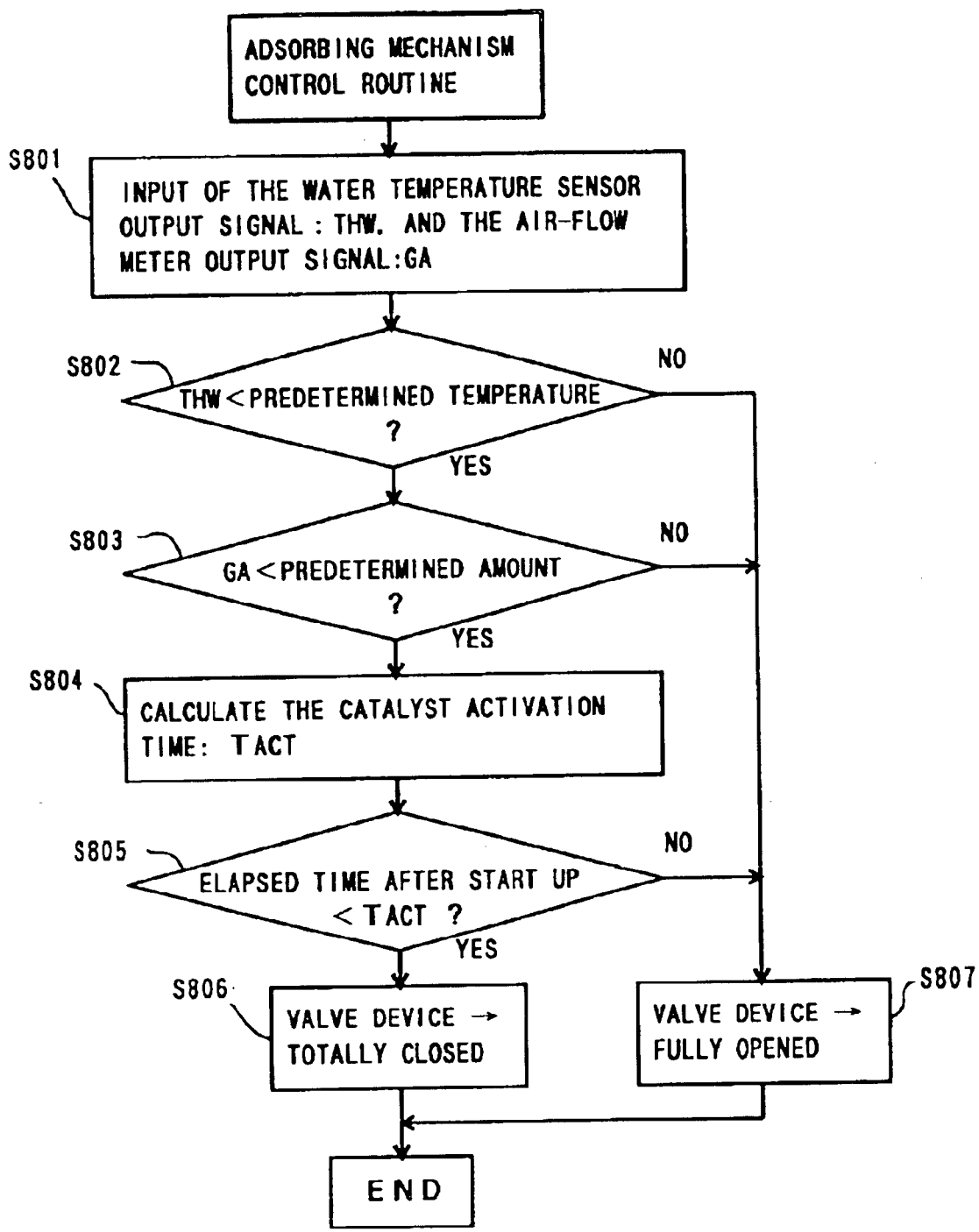
FIG. 8 is a flowchart showing an adsorbing mechanism control routine.

The CPU 24, at the time of controlling the valve device 180 of the adsorbing mechanism 17, executes an adsorbing mechanism control routine as shown in FIG. 8. This adsorbing mechanism control routine is a routine that is repeatedly executed at every predetermined time (e.g., every time when the crank position sensor 20 outputs a pulse signal).

In the adsorbing mechanism control routine, the CPU 24, first at S801, inputs the output signal, THW, of the water temperature sensor 21 and the output signal, GA, of the air flow meter 9.

At S802 to S805, the CPU 24 determines whether or not the second three way catalyst 16 is in the activated state.

Specifically, at S802, the CPU 24 determines whether the output signal, THW, of the water temperature sensor 21 inputted at S801 is lower than the predetermined temperature.

When it is determined, at S802, that the output signal, THW, of the water temperature sensor 21, is lower than the predetermined temperature, the CPU 24 proceeds to S803 and determines whether the output signal, GA, of the air flow meter 9, inputted at S801 is lower than the predetermined amount.

At S803, when it is determined that the output signal, GA, of the air flow meter 9, is lower than the predetermined amount, the CPU 24 proceeds to S804 and accesses the activation determining control map of the ROM 25, using the output signal, THW, of the water temperature sensor 21 inputted at S801 as a parameter so as to calculate the catalyst activation time, TACT, of the second three way catalyst 16.

At S805, the elapsed time since the time when the internal combustion engine 1 is started up (elapsed time after start up) and the catalyst activation time, TACT, calculated at S804 are compared.

At S805, if it is determined that the elapsed time after start up is shorter than the catalyst activation time, TACT, the CPU 24 determines that the second three catalyst 16 is in the inactivated state and proceeds to S806.

At S806, the CPU 24 controls the actuator 186 of the valve device 180 so that the main exhaust path in the adsorbing mechanism 17 is in the non-conductive state (the valve body 182 of the valve device 180 is in the totally closed state) as shown in FIG. 2.

In this case, all exhaust gas exhausted from the internal combustion engine 1 flows through the bypass path inside the absorbing mechanism 17 and flows into the second three way catalyst 16, and the unburned HC in the exhaust gas is adsorbed in the HC adsorbent 172 in the bypass path. As a result, even when the second three way catalyst 16 is in the inactivated state, the unburned HC in the exhaust gas is not discharged to the atmosphere.

On the other hand, if it is determined, at S802, that the output signal, THW, of the water temperature sensor 21 is equal to or higher than the predetermined temperature, if it is determined, at S803, that the output signal, GA, of the air flow meter 9 is the predetermined amount or greater, or if it is determined, at S805, that the elapsed time after start up is the catalyst activation time, TACT, or longer, the CPU 24 determines that the second three way catalyst 16 is in the activated state and proceeds to S807.

At S807, the CPU 24 controls the actuator 186 of the valve device 180 so that the main exhaust path in the adsorbing mechanism 17 is in the conductive state (the valve body 182 of the valve device 180 is in the fully opened state) as shown in FIG. 4.

In this case, in the adsorbing mechanism 17, both main exhaust path and bypass path are in the conductive state, thereby most of the exhaust gas from the internal combustion engine 1 passing through the main exhaust path flows into the second three way catalyst 16, and a small amount of the exhaust gas passing through the bypass path flows into the second three way catalyst 16.

Hydrocarbons (HC), carbon monoxide (CO), and nitrogen oxides ($NO_x$) contained in the exhaust gas that passing through the main exhaust path and the bypass path flows into the second three way catalyst 16 are purified by the second three way catalyst 16 that is in the activated state.

In the bypass path, when the exhaust gas passes through the HC adsorbent 172, the heat of the exhaust gas is transmitted to the HC adsorbent 172, and the temperature of the HC adsorbent 172 increases. However, since the flow rate of the exhaust gas flowing through the bypass path is very small, the temperature of the HC adsorbent 172 moderately increases.

Consequently, the unburned HC adsorbed in the HC adsorbent 172 is gradually desorbed so that a change to the rich side of the exhaust gas flowing out from the HC adsorbent 172 (the exhaust gas containing the unburned HC desorbed from the HC adsorbent 172) is very small, thereby eliminating the excessive rich state.

The air-fuel ratio of the exhaust gas flowing into the second three way catalyst 16, in other words, the change to the rich side of the exhaust gas flowing out from the adsorbing mechanism 17 becomes very small. Accordingly, the detection accuracy of the second air-fuel ratio sensor 19 is not lowered so that it is possible to accurately execute the second air-fuel ratio feedback control described above.

Next, a degradation determining control for the exhaust gas purifying catalyst that is the gist of the present invention will be described. In the present embodiment, the case of determining the degradation of the first three way catalyst 15 located in the upstream of the HC adsorbent 172 will be explained as an example.

In the process in which the HC adsorbent 172 adsorbs the unburned HC contained in the exhaust gas (HC adsorbing process), during the period in which the temperature of the first three way catalyst 15 increases to the activation temperature of higher (catalyst inactivated period), the unburned HC contained in the exhaust gas exhausted from the internal combustion engine 1 is not purified in the first three way catalyst 15, and, therefore, substantially all unburned HC contained in the exhaust gas is adsorbed in the HC adsorbent 172. In the HC adsorbing process, during the period after at least part of the first three way catalyst 15 is activated (catalyst activated period), at least part of the unburned HC contained in the exhaust gas exhausted from the internal combustion engine 1 is purified in the first three way catalyst 15, and, therefore, the amount of the unburned HC adsorbed in the HC adsorbent 172 becomes small compared with that of during the catalyst inactivated period.

At that time, when the lower temperature activation capability of the first three way catalyst 15 is lowered due to the degradation of the first three way catalyst 15, the catalyst inactivated period becomes longer and the catalyst activated period becomes shorter in the HC adsorbing process, and thereby the amount of the unburned HC adsorbed in the HC adsorbent 172 becomes greater than that in the case where the first three way catalyst 15 is normal.

Therefore, in the present embodiment, the degradation of the first three way catalyst 15 is determined using the total amount of the unburned HC (HC adsorbing amount), which the HC adsorbent 172 adsorbed during the HC adsorbing process, as a parameter.

As a method to calculate the HC adsorbing amount, a method as follows may be exemplified. For example, during the time when the HC adsorbent 172 is in the temperature range of desorbing the unburned HC, the difference between the fuel injection amount which reflects only the first air-fuel ratio feedback control and the fuel injection amount which reflects the first and second air-fuel ratio feedback controls is estimated to calculate the HC adsorbing amount.

Specifically, when the unburned HC is desorbed from the HC adsorbent 172, if the first and second air-fuel ratio sensors 18, 19 are normal, the fuel injection amount which reflects the first and second air-fuel ratio feedback controls is smaller than the fuel injection amount which reflects only the first air-fuel ratio feedback control by the amount corresponding to the unburned HC amount desorbed from the HC adsorbent 172.

Figure 9:
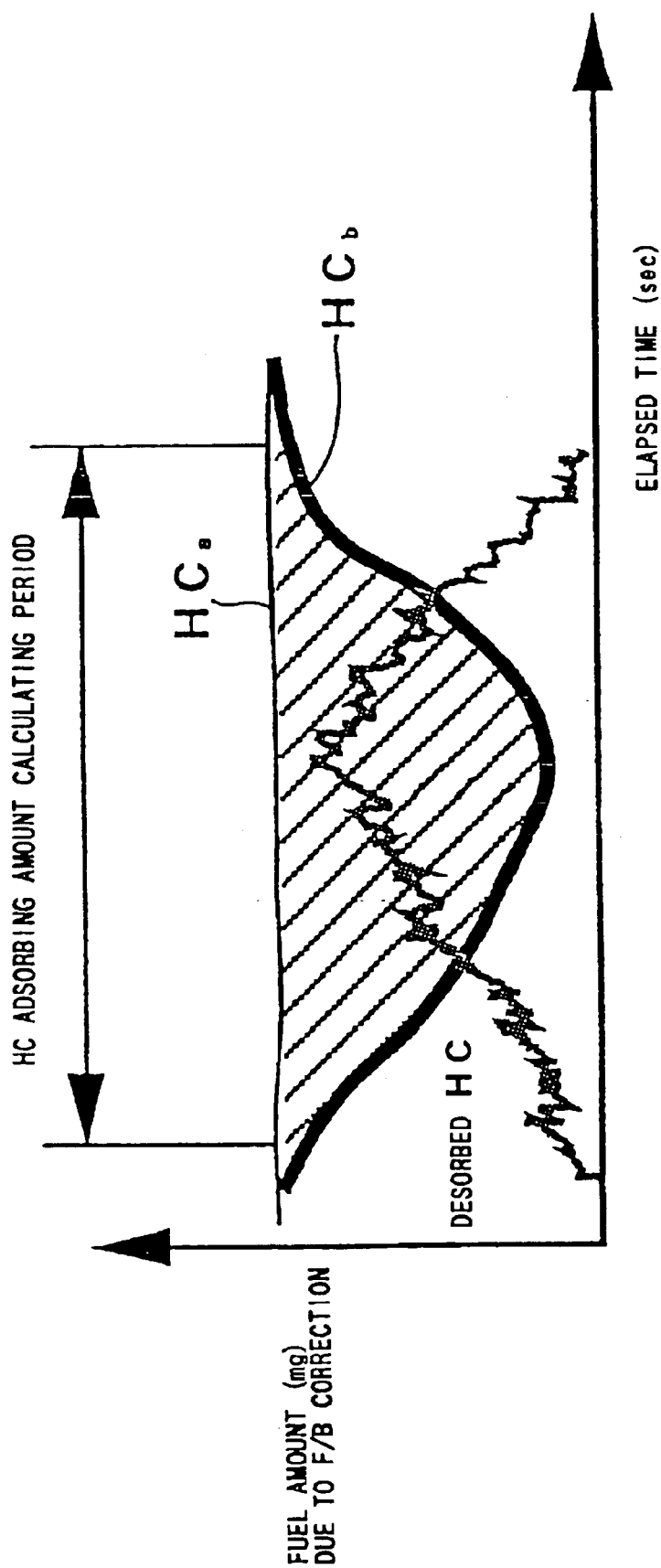
FIG. 9 is a view explaining a calculating method of an unburned HC amount that was adsorbed in an HC adsorbent.

Accordingly, as shown in FIG. 9, during the period of desorbing the unburned HC from the HC adsorbent 172, by estimating the difference between the fuel injection amount, HCa, which reflects only the first air-fuel ratio feedback control and the fuel injection amount, HCb, which reflects the first and second air-fuel ratio feedback controls, it is possible to estimate the total amount of the unburned HC adsorbed in the HC adsorbent 172.

The CPU 24, after determining the HC adsorbing amount based on the method described above, compares the HC adsorbing amount with a predetermined reference amount. This reference amount has a value that is previously obtained experimentally when the first three way catalyst 15 is normal, and this value may be a fixed value, or a variable value that can be changed using the operational history of the internal combustion engine 1 in the HC adsorbing process, as a parameter.

The CPU 24 determines that the first three way catalyst 15 is normal when the HC adsorbing amount is equal to or smaller than the reference amount, and that the first three way catalyst 15 is determined as degraded when the HC adsorbing amount exceeds the reference amount.

The degradation determining control for the first three way catalyst 15 will be described specifically, below.

Figure 10:
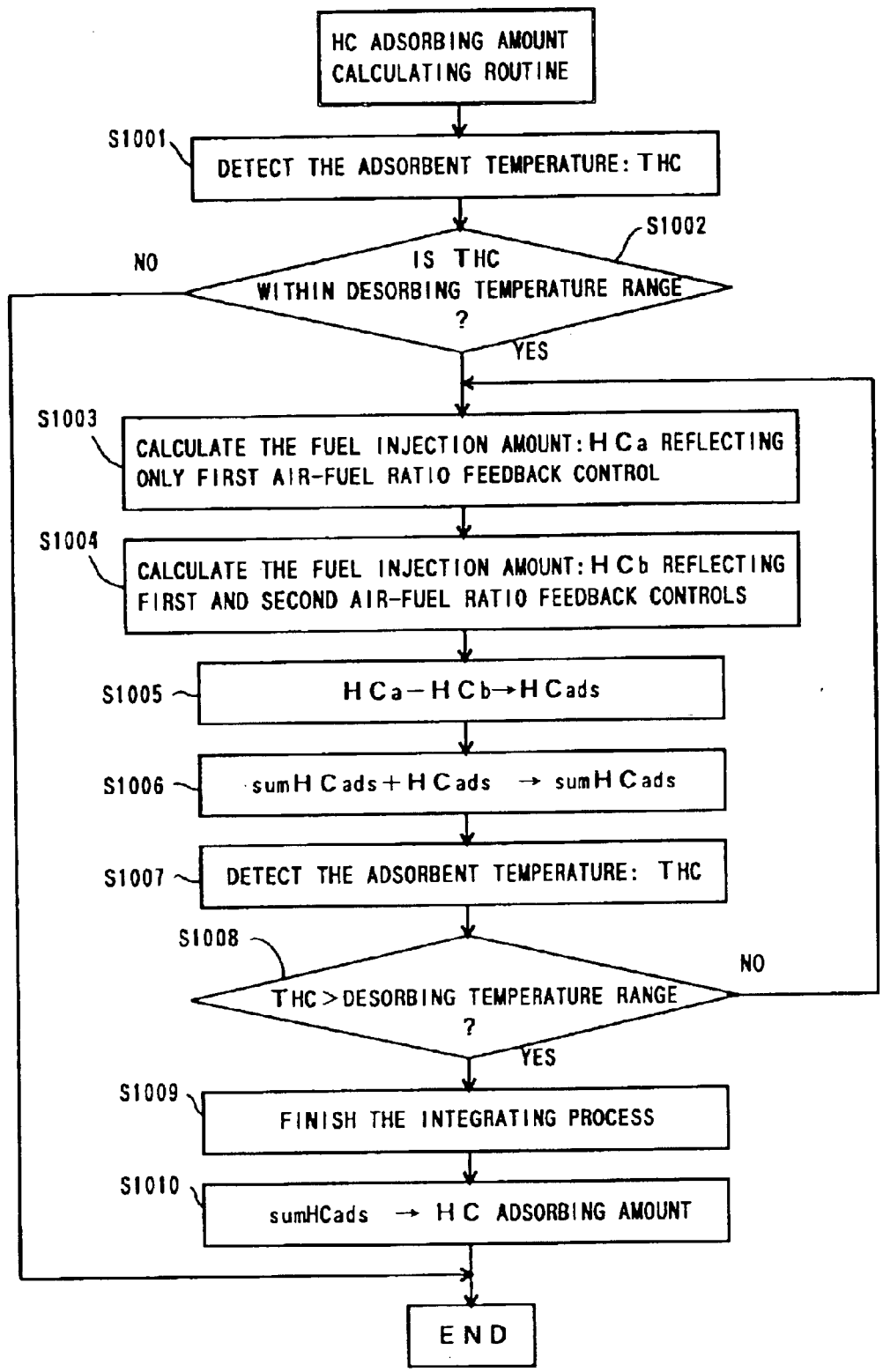
FIG. 10 is a flowchart showing an HC adsorbing amount calculating routine.

For determining the degradation of the first three way catalyst 15, the CPU 24 executes the HC adsorbing amount calculating routine as shown in FIG. 10 and the catalyst degradation determining routine as shown in FIG. 11.

These HC adsorbing amount calculating routine and catalyst degradation determining routine are routines that are repeatedly executed at every predetermined time (e.g., each time the crank position sensor 20 outputs a pulse signal).

First, in the HC adsorbing amount calculating routine, the CPU 24 detects, at S1001, a bed temperature, THC, of the HC adsorbent 172. The method to detect the bed temperature, THC, of the HC adsorbent 172 includes, for example, a method to determine based on the output signal, THW, of the water temperature sensor 21, a method to determine based on the elapsed time since the time of starting up of the internal combustion engine 1, a method to determine based on the estimated value of the intake air amount since the start up time of the internal combustion engine 1, and a method to directly detect by attaching the temperature sensor to the HC adsorbent 172.

At S1002, the CPU24 determines whether or not the bed temperature, THC, of the HC adsorbent 172 detected at S1001 is within the temperature range (e.g., 70° C. to 200° C.) at which the unburned HC adsorbed in the HC adsorbent 172 is desorbed from the HC adsorbent 172.

When it is determined at S1002 that the bed temperature, THC, of the HC adsorbent 172 is not within the desorbing temperature range, the CPU 24 finishes the execution of this routine.

When it is determined at S1002 that the bed temperature, THC, of the HC adsorbent 172 is within the desorbing temperature range, the CPU 24 proceeds to S1003 and calculates the fuel injection amount, HCa, which reflects only the first air-fuel ratio feedback control (the fuel injection amount which does not reflect the second air-fuel ratio feedback control).

At S1004, the CPU 24 calculates the fuel injection amount, HCb, which reflects the second air-fuel ratio feedback control in addition to the first air-fuel ratio feedback control.

At S1005, the CPU 24 calculates the fuel correction amount, HCads, according to the second air-fuel ratio feedback control by subtracting the fuel injection amount, HCb, calculated at S1004, from the fuel injection amount, HCa, calculated at S1003.

At S1006, the CPU 24 executes the integrating process of the fuel correction amount, HCads. Specifically, the CPU 24 accesses the predetermined region of the RAM 26 and reads an integrated value, sumHCads, of the fuel correction amounts up to the last time. Then, the CPU 24 adds the fuel correction amount, HCads, calculated at S1005 to the previous integrated value, sumHCads, of the fuel correction amounts up to the last time so as to calculate a new integrated value, sumHCads, and writes the new integrated value, sumHCads, in the RAM 26.

At S1007, the CPU 24 detects the bed temperature, THC, of the HC adsorbent 172, again.

At S1008, the CPU 24 determines whether or not the HC adsorbent bed temperature, THC, detected at S1007 is beyond the desorbing temperature range of the unburned HC (whether or not the HC adsorbent bed temperature, THC, is higher than the upper limit value of the desorbing temperature range).

When it is determined at S1008 that the HC adsorbent bed temperature, THC, is not beyond the desorbing temperature range, the CPU 24 repeatedly executes the processes from the S1003, et.seq.to update the integrated value, sumHCads, of the fuel correction amount.

When it is determined at S1008 that the HC adsorbent bed temperature, THC, is beyond the desorbing temperature range, the CPU 24 deems that the unburned HC adsorbed in the HC adsorbent 172 is all desorbed and proceeds to S1009.

At S1009, the CPU 24 finishes the integrating process of the fuel correction amount.

At S1010, the CPU 24 reads the final integrated value, sumHCads, from the predetermined region of the RAM 26 and deems the integrated value, sumHCads, as the unburned HC amount (HC adsorbing amount) adsorbed in the HC adsorbent 172, and stores it in the predetermined region of the RAM 26.

Next, in the catalyst degradation determining routine, the CPU 24, at S1101, first inputs the output signal, THW, of the water temperature sensor 21.

At S1102, the CPU 24 determines whether or not the output signal, THW, of the water temperature sensor 21 inputted at S1101 is equal to or higher than the predetermined temperature, that is, whether or not the warming up of the internal combustion engine 1 is completed.

When it is determined at S1102 that the output signal, THW, of the water temperature sensor 21 is lower than the predetermined temperature, the CPU 24 deems that the warming up of the internal combustion engine 1 is not completed and finishes the execution of this routine.

This is because when the warming up of the internal combustion engine 1 is not completed, the first and second air-fuel ratio feedback control execution conditions are not satisfied, and it becomes impossible to execute the process of determining the unburned HC amount (HC adsorbing amount) adsorbed in the HC adsorbent 172.

When it is determined at S1102 that the output signal, THW, of the water temperature sensor 21 is equal to or higher than the predetermined temperature, the CPU 24 deems that the warming up of the internal combustion engine 1 is completed, and proceeds to S1003.

At S1103, the CPU 24 detects the bed temperature, THC, of the adsorbent 172 of the adsorbing mechanism 17.

At S1104, the CPU 24 compares the bed temperature, THC, of the HC adsorbent 172 detected at S1103 with the upper limit value of the temperature range (hereafter called the desorb completion temperature) at which the unburned HC adsorbed in the HC adsorbent 172 is desorbed from the HC adsorbent 172.

When it is determined at S1104 that the bed temperature, THC, of the HC adsorbent 172 is lower than the desorb temperature, the CPU 24 deems that desorption of the unburned HC adsorbed in the HC adsorbent 172 has not yet finished and the calculating process of the HC adsorbing amount is not completed yet, and finishes executing this routine.

When it is determined at S1104 that the bed temperature, THC, of the HC adsorbent 172 is equal to or higher than the desorb completion temperature, the CPU 24 deems that desorption of the unburned HC adsorbed in the HC adsorbent 172 is completed and that the calculating process of the HC adsorbing amount by the HC adsorbing amount calculating routine described above is completed, and proceeds to S1105.

At S1105, the CPU 24 accesses the predetermined region of the RAM 26 and reads the HC adsorbing amount calculated by the HC adsorbing amount calculating routine.

At S1106, the CPU 24 determines whether or not the HC adsorbing amount read at S1105 exceeds the predetermined reference amount.

When it is determined at S1106 that the HC adsorbing amount exceeds the predetermined reference amount, the CPU 24 proceeds to S1107 where it determines that the first three way catalyst 15 is abnormal, and have the information indicating that the first three way catalyst 15 is normal stored in the RAM 26 or the backup RAM 27.

At that time, the CPU 24 may light up a warning lamp provided in a car room so as to urge the driver to repair the first three way catalyst 1.

When it is determined at S1106 that the HC adsorbing amount is smaller than the predetermined reference amount, the CPU 24 proceeds to S1108 where it determines that the first three way catalyst 15 is normal, and have the information indicating that the first three way catalyst 15 is normal stored in the RAM 26 or the backup RAM 27.

The CPU 24, after finishing the execution of the process of S1107 or S1108, finishes the execution of this routine.

As described above, the CPU 24 executes the HC adsorbing amount calculating routine, whereby the adsorbing amount detection device according to the present invention can be realized, and the CPU 24 executes the catalyst degradation determining routine, whereby the catalyst degradation determining device according to the present invention can be realized.

Thus, according to the present embodiment, the degradation of the first three way catalyst 15 is determined using the unburned HC amount actually adsorbed in the HC adsorbent 172 during the HC adsorbing process, as a parameter, thereby it is possible to perform a highly accurate degradation determination based on the correlation between the unburned HC amount adsorbed in the HC adsorbent 172 and the low temperature activation capability of the first three way catalyst 15.

In the present embodiment, the adsorbing member and the predetermined component amount detection device are exemplified by the HC adsorbent adsorbing the unburned fuel component (unburned hydrocarbons (HC)) contained in the exhaust gas, and the air-fuel ratio sensor, respectively. However, a $NO_x$ adsorbent (Nox catalyst) instead of the HC adsorbent and a Nox sensor instead of the air-fuel ratio sensor may be employed.

What is claimed is:

1. A catalyst degradation detecting device in an internal combustion engine comprising:

an adsorbing member provided in an exhaust passage of the internal combustion engine, for adsorbing a predetermined component contained in exhaust gases when a predetermined adsorbing condition is satisfied, and desorbing the adsorbed predetermined component when a predetermined desorbing condition is satisfied;

a first exhaust gas purifying catalyst in the exhaust passage at the upstream of said adsorbing member for purifying the predetermined component contained in exhaust gases when the temperature is equal to or higher than the predetermined activation temperature;

a second exhaust gas purifying catalyst provided in the exhaust passage at the downstream of said adsorbing member for purifying the predetermined component contained in exhaust gases when the temperature is equal to or higher than the predetermined activation temperature;

a predetermined component amount detecting device provided between said adsorbing member and said second exhaust gas purifying catalyst in the exhaust passage, for detecting the predetermined component amount contained in exhaust gases flowing into the second exhaust gas purifying catalyst; and a fuel injection amount connection device for correcting the fuel injection amount of the internal combustion engine and regulating the predetermined component amount exhausted from internal combustion engine so that the predetermined component amount detected by the predetermined component amount detection device meets a predetermined target component amount;

an adsorbing amount detection device for detecting the amount of the predetermined component adsorbed by the adsorbing member when said exhaust gas purifying catalyst is in an inactive state based on a corrected amount by said fuel injection amount correction device when said absorbing member desorbs the predetermined component; and a catalyst degradation determining device for determining that a low temperature activation capability of said first exhaust gas purifying catalyst is degraded when the amount of the predetermined component detected by said adsorbing amount detection device exceeds a predetermined value.

2. A catalyst degradation detecting device in an internal combustion engine comprising:

an adsorbing member provided in an exhaust passage of the internal combustion engine, for adsorbing a predetermined component contained in exhaust gases when a temperature is lower than a predetermined temperature, and desorbing the adsorbed predetermined component when the temperature is within a predetermined temperature range;

a first exhaust gas purifying catalyst providing in the exhaust passage at the upstream of said adsorbing member for purifying the predetermined component in exhaust gases when the temperature is equal to or higher than the predetermined activation temperature;

a second exhaust gas purifying catalyst provided in the exhaust passage at the downstream of said adsorbing member for purifying the predetermined component contained in exhaust gases when the temperature is equal to or higher than the predetermined activation temperature;

a predetermined component amount detecting device provided between said adsorbing member and said second exhaust gas purifying catalyst in the exhaust passage, for detecting the predetermined component amount contained in exhaust gases flowing into the second exhaust gas purifying catalyst; and a fuel injection amount correction device for correcting the fuel injection amount of the internal combustion engine and regulating the predetermined component amount exhausted from the internal combustion engine so that the predetermined component amount detected by the predetermined component amount detecting device meets a predetermined target component amount;

an adsorbing amount detection device for detecting the amount of the predetermined component adsorbed by the adsorbing member when said exhaust gas purifying catalyst is in an inactive state based on a corrected amount by said fuel injection amount correction device when said absorbing member desorbs the predetermined component; and a catalyst degradation determining device for determining that a low temperature activation capability of said first exhaust gas purifying catalyst is degraded when the amount of the predetermined component detected by said adsorbing amount detection device exceeds a predetermined value.

3. A catalyst degradation device in an internal combustion engine according to claim 2, further comprising:

a temperature detection device for detecting the temperature of said adsorbing member; and wherein said adsorbing amount detecting accumulation amounts corrected by said fuel injection amount correction device during the time period when the detected value of said temperature detecting device is within said predetermined temperature range, and calculates the amount of the predetermined component adsorbed in the adsorbing member, and said catalyst degradation determining device determines that said first exhaust gas purifying catalyst is degraded when the amount of the predetermined component calculated by said adsorbing amount detection device exceeds the predetermined reference.

4. A catalyst degradation detecting device in an internal combustion engine according to claim 1, wherein said adsorbing member is an HC adsorbent adsorbing the unburned hydrocarbons contained in exhaust gases.

5. A catalyst degradation detecting device in an internal combustion engine according to claim 1, wherein said adsorbing member is $NO_x$ adsorbent adsorbing nitrogen oxide contained in exhaust gases.

* * * * *

UNITED STATES PATENT AND TRADEMARK OFFICE
CERTIFICATE OF CORRECTION

PATENT NO. : 6,797,517 B1
DATED : September 28, 2004
INVENTOR(S) : Koichi Hoshi et al.

It is certified that error appears in the above-identified patent and that said Letters Patent is hereby corrected as shown below:

Drawings,
Figure 6, first text box, change "cotrol" to -- control --;
Figure 7, second text box, change "sutisfied" to -- satisfied --;

Column 6,
Line 49, change "monixide" to -- monoxide --;

Column 20,
Line 51, after "catalyst" insert -- providing --;

Column 21,
Line 1, change "connection" to -- correction --;
Line 4, after "from" insert -- the --;
Line 33, after "component" insert -- contained --;

Column 22,
Lines 26-27, after "detecting", delete "accumulation" and insert -- device accumulates --.

Signed and Sealed this

Seventh Day of June, 2005

JON W. DUDAS
*Director of the United States Patent and Trademark Office*